(12) United States Patent
Honda et al.

(10) Patent No.: US 8,629,874 B2
(45) Date of Patent: Jan. 14, 2014

(54) MOBILE DISPLAY DEVICE AND METHOD OF CONTROLLING DISPLAY OF CONVERSION CANDIDATES OF INPUT CHARACTERS ON THE MOBILE DISPLAY DEVICE

(75) Inventors: Natsuhito Honda, Kanagawa (JP); Hiroshi Tsuruta, Kanagawa (JP); Tomoyuki Urano, Kanagawa (JP); Michiko Takei, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 697 days.

(21) Appl. No.: 12/741,022

(22) PCT Filed: Oct. 30, 2008

(86) PCT No.: PCT/JP2008/069813
§ 371 (c)(1),
(2), (4) Date: Aug. 23, 2010

(87) PCT Pub. No.: WO2009/057721
PCT Pub. Date: May 7, 2009

(65) Prior Publication Data
US 2011/0175917 A1  Jul. 21, 2011

(30) Foreign Application Priority Data

Oct. 30, 2007 (JP) .................. 2007-281894
Oct. 30, 2007 (JP) .................. 2007-281901
Oct. 30, 2007 (JP) .................. 2007-281910
Oct. 30, 2007 (JP) .................. 2007-282301

(51) Int. Cl.
*G06T 11/00* (2006.01)
(52) U.S. Cl.
USPC ....................................................... 345/467
(58) Field of Classification Search
None
See application file for complete search history.

(56) References Cited

U.S. PATENT DOCUMENTS 6,424,363 B1 * 7/2002 Matsuba et al. .............. 715/864
6,704,034 B1 * 3/2004 Rodriguez et al. ........... 715/860
6,952,220 B1 * 10/2005 Rossmann .................... 345/684

(Continued)

FOREIGN PATENT DOCUMENTS

JP  08-185452  7/1996
JP  09-081320  3/1997

(Continued)

OTHER PUBLICATIONS

International Search Report for PCT/JP2008/069813, mailed on Jan. 27, 2009, 3 pages.

(Continued)

*Primary Examiner* — Daniel Hajnik
*Assistant Examiner* — Anh-Tuan V Nguyen
(74) *Attorney, Agent, or Firm* — Duane Morris LLP

(57) ABSTRACT

It is possible to provide a mobile display device which can improve usability even when the character size is increased for improving visibility. A method for controlling the mobile display device is also disclosed. A control unit (18) can set a conversion candidate of an input character displayed on a second display region (conversion candidate character display region (162)) of a display unit (16) to a first display mode (normal mode) for displaying the conversion candidate in a first character size and to a second display mode (enlarged mode) for displaying the conversion candidate in a second character size greater than the first character size while differentiating a display priority of a plurality of conversion candidates to be displayed in the second display region in the first display mode and a display priority of a plurality of conversion candidates to be displayed in the second display region in the second display mode.

13 Claims, 25 Drawing Sheets

(56) References Cited

U.S. PATENT DOCUMENTS

| | | | |
|---|---|---|---|
| 2002/0040866 A1* | 4/2002 | Tuneld et al. | 209/546 |
| 2003/0233615 A1* | 12/2003 | Morimoto et al. | 715/501.1 |
| 2004/0139404 A1* | 7/2004 | Kawashima et al. | 715/530 |
| 2005/0022236 A1* | 1/2005 | Ito et al. | 725/39 |
| 2005/0043949 A1* | 2/2005 | Roth et al. | 704/251 |
| 2006/0097993 A1* | 5/2006 | Hietala et al. | 345/173 |
| 2006/0227153 A1* | 10/2006 | Anwar et al. | 345/660 |
| 2007/0037611 A1* | 2/2007 | Mori et al. | 455/575.1 |
| 2007/0124501 A1* | 5/2007 | Lee et al. | 709/246 |
| 2007/0256035 A1* | 11/2007 | Matsuzawa et al. | 715/864 |

FOREIGN PATENT DOCUMENTS

| | | |
|---|---|---|
| JP | 2000-305746 | 11/2000 |
| JP | 2002-189553 | 7/2002 |
| JP | 2006-209558 | 8/2006 |
| JP | 2007-206978 | 8/2007 |
| KR | 10-2007-0097889 | 10/2007 |

OTHER PUBLICATIONS

International Preliminary Report on Patentability for PCT/JP2008/069813, issued Jun. 1, 2010, 7 pages.

Office Action from Japanese Patent Application No. 2007-281894, mailed on Apr. 3, 2012.

Notice of Grounds for Rejection (with translation) for KR 10-2012-7003692, mailed May 10, 2012, 12 pages.

JP 2007-281910 Office Action mailed Oct. 2, 2012.

* cited by examiner

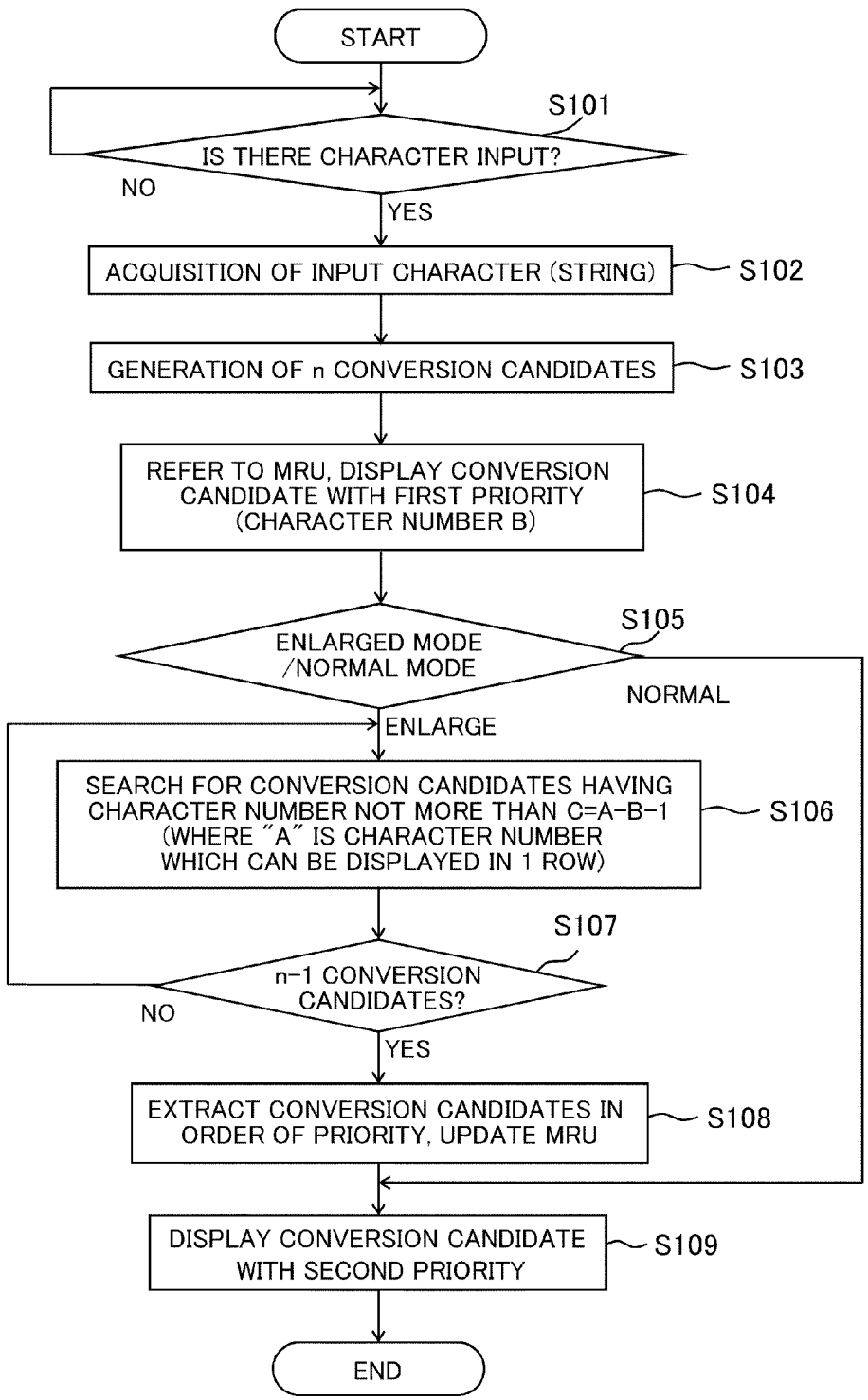

《NORMAL MODE》

《ENLARGED MODE》

《NORMAL MODE》

《ENLARGED MODE》

《NORMAL MODE》

《ENLARGED MODE》

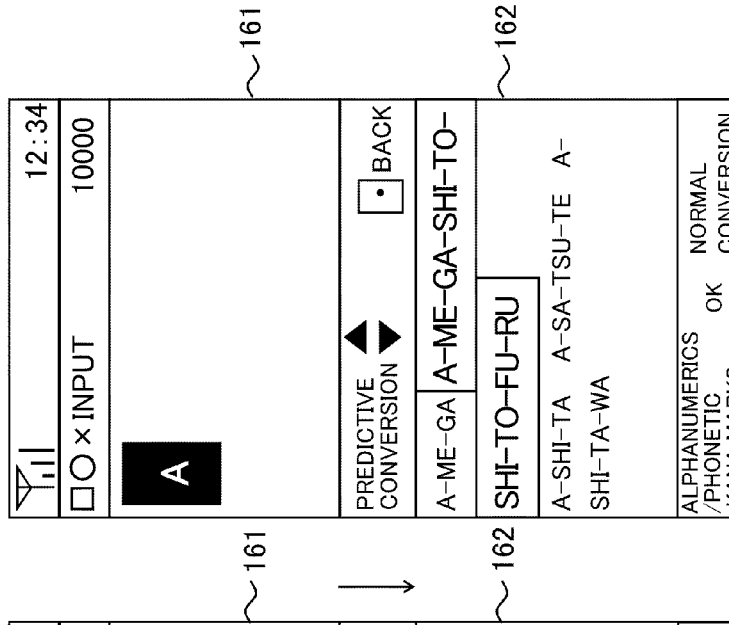
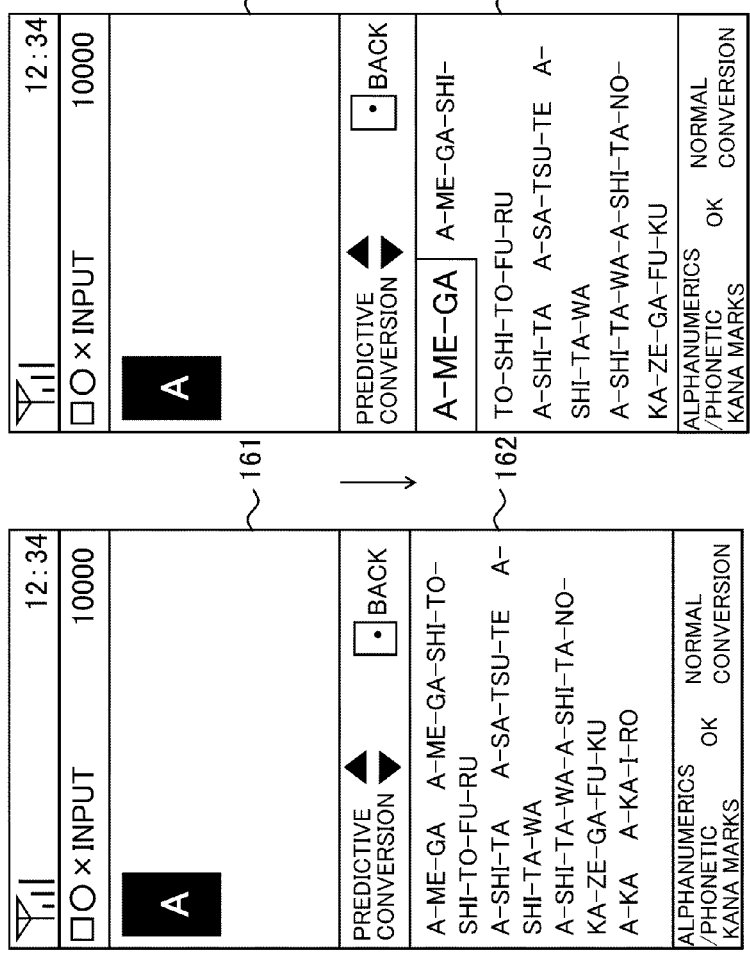
FIG. 9A  FIG. 9B  FIG. 9C

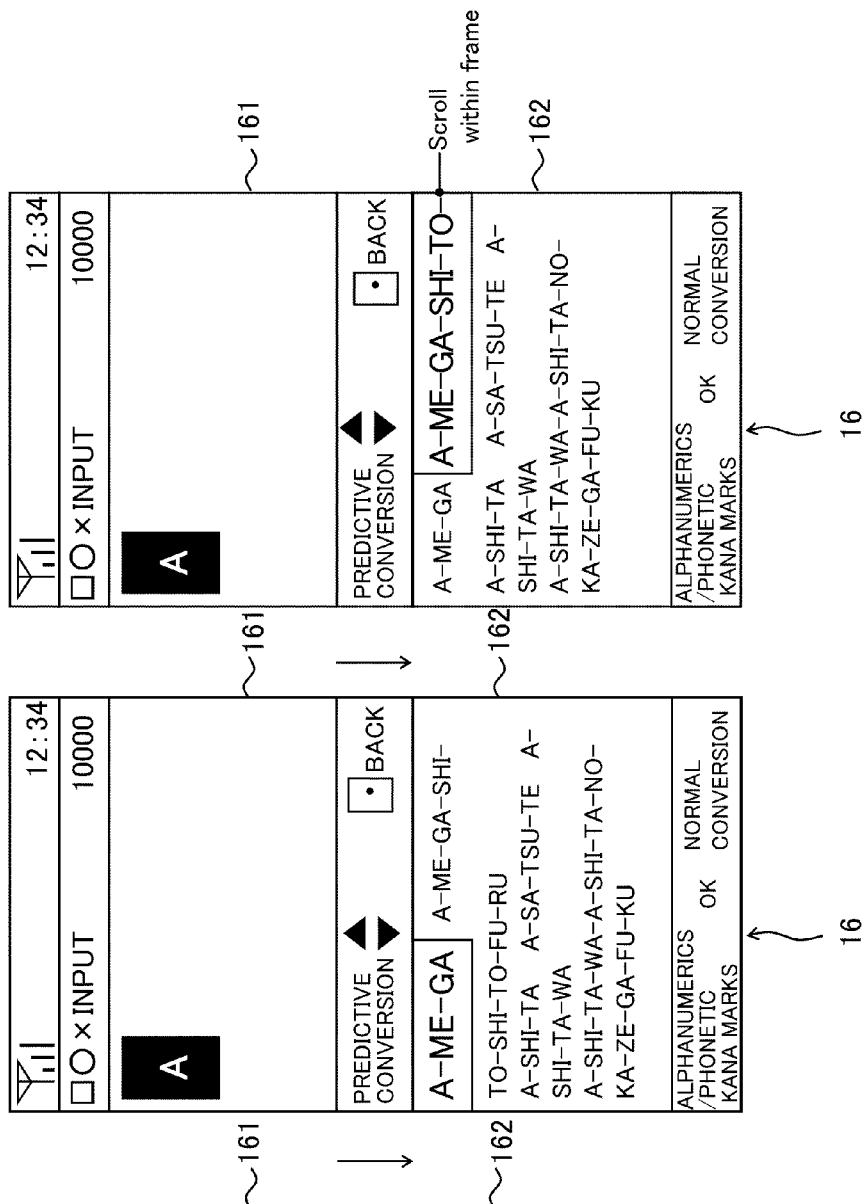

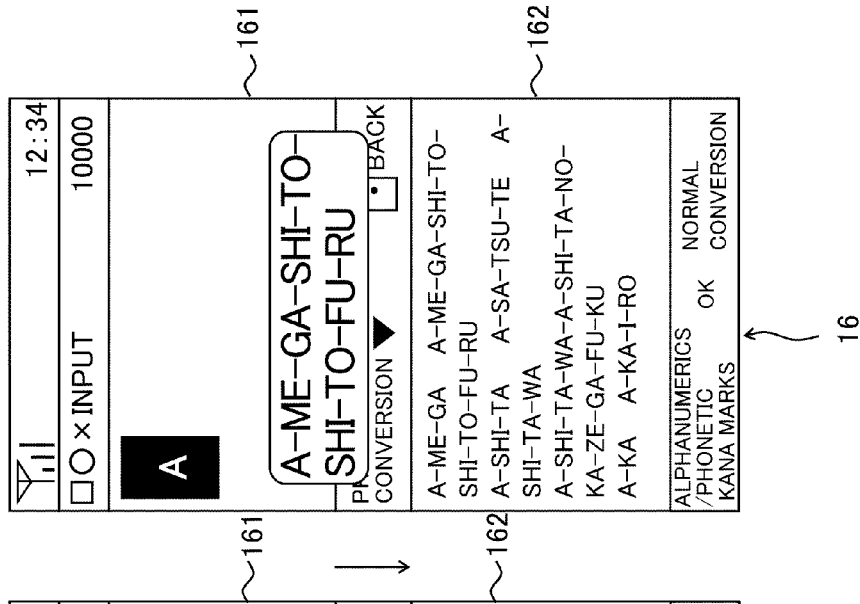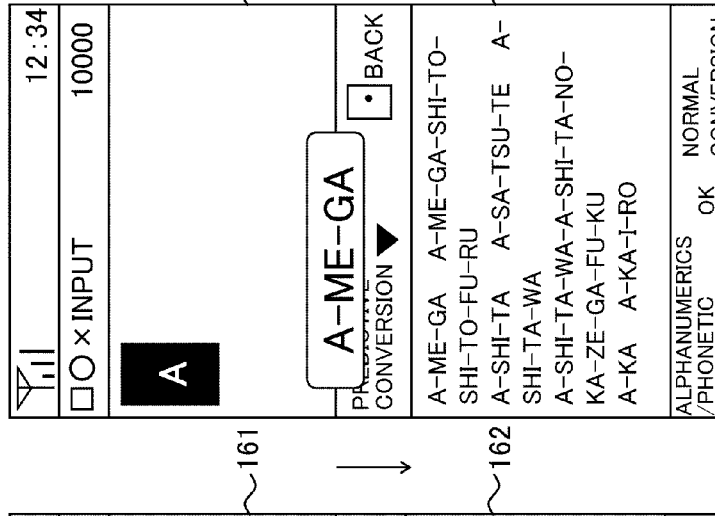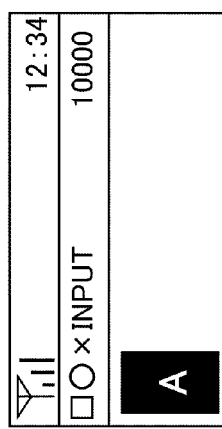

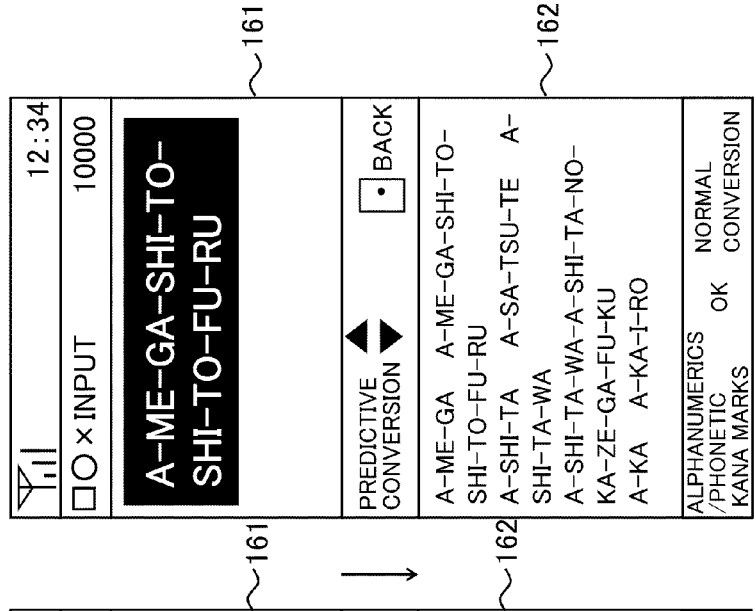
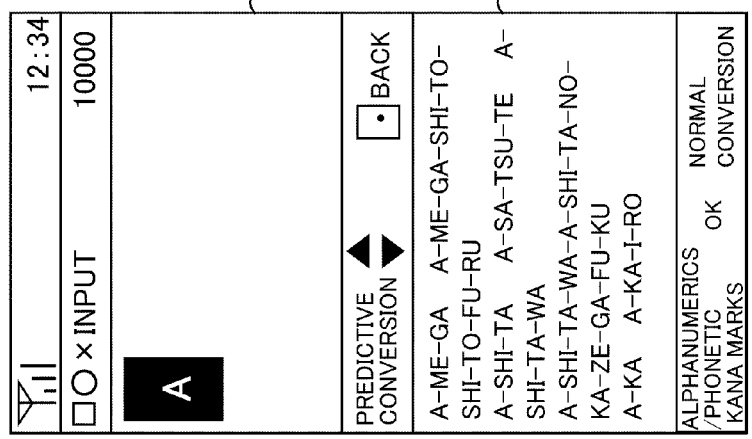

NORMAL TIME

FONT SIZE ENLARGEMENT TIME

NORMAL TIME

FONT SIZE ENLARGEMENT TIME

NORMAL TIME

FONT SIZE ENLARGEMENT TIME

FIG. 24A NORMAL MODE
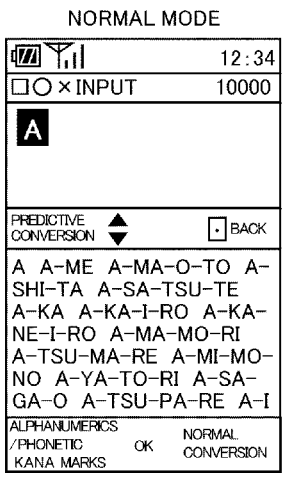
FIG. 24B NORMAL MODE
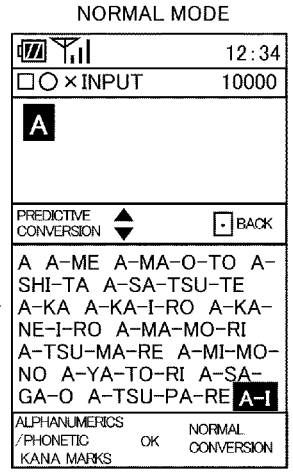
FIG. 24C NORMAL MODE
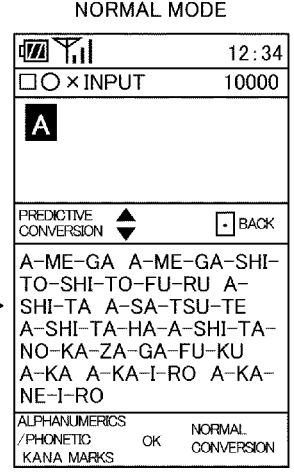
FIG. 24D ENLARGED MODE
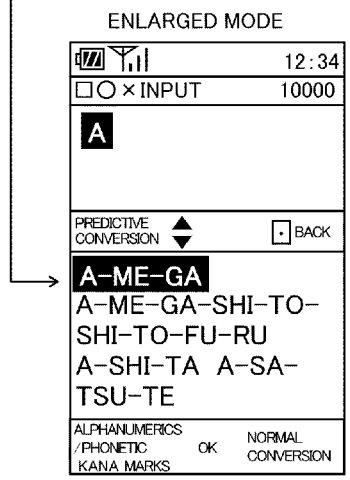
FIG. 24E ENLARGED MODE
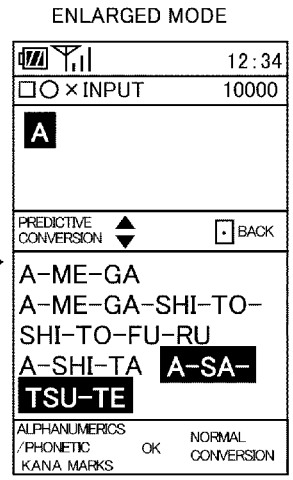
FIG. 24F ENLARGED MODE
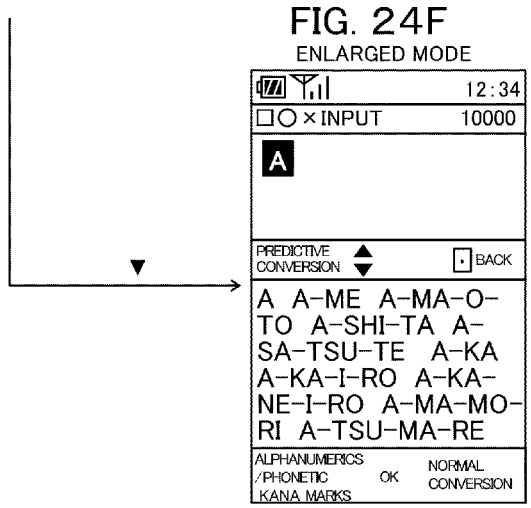

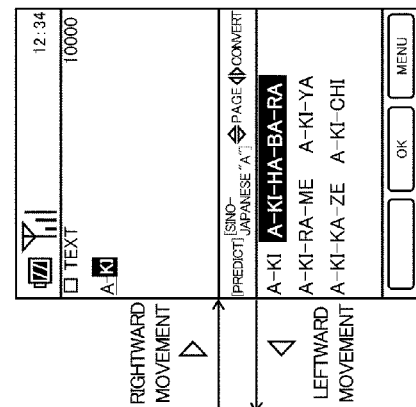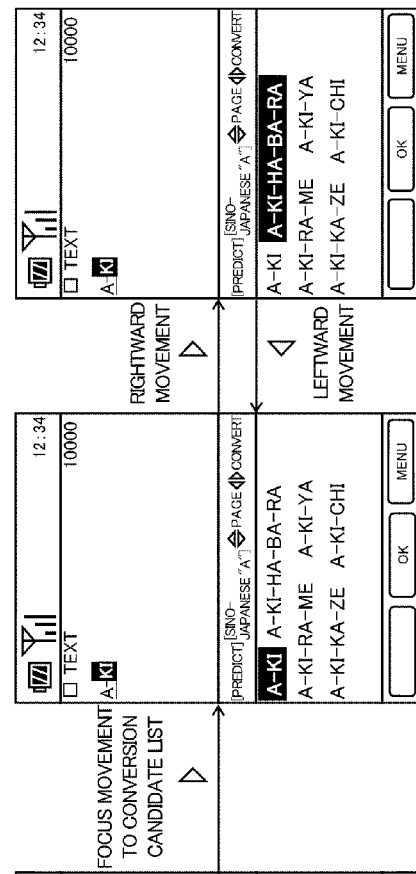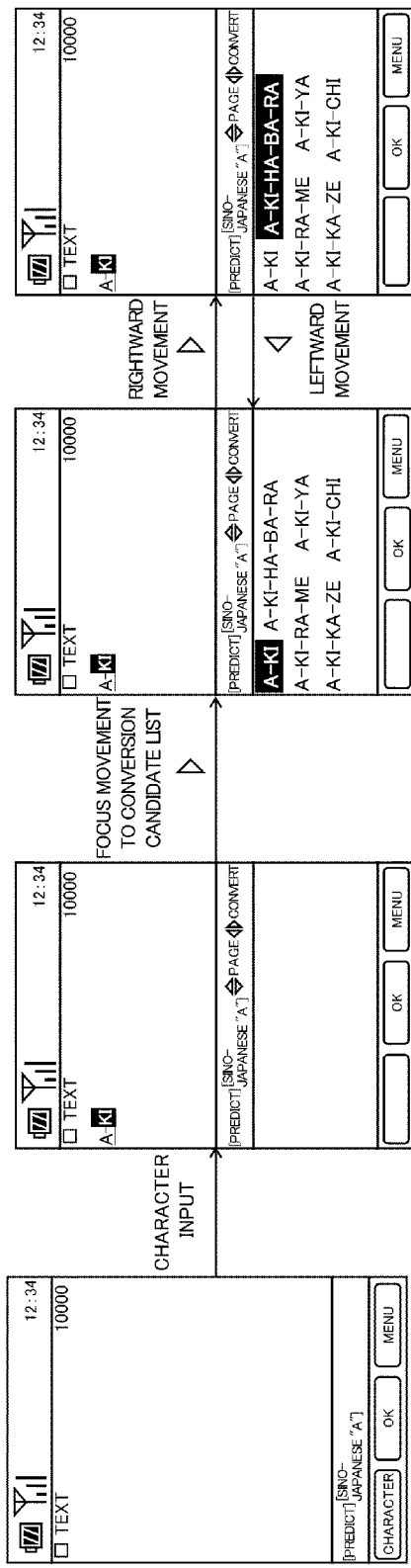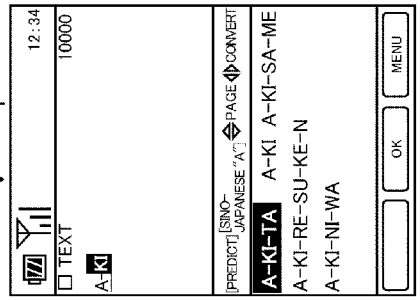

MOBILE DISPLAY DEVICE AND METHOD OF CONTROLLING DISPLAY OF CONVERSION CANDIDATES OF INPUT CHARACTERS ON THE MOBILE DISPLAY DEVICE

CROSS-REFERENCE TO RELATED APPLICATIONS

This is a U.S. National Phase Application of International Application No. PCT/JP2008/069813 filed Oct. 30, 2008, which claims priority to Japanese Patent Application Nos. 2007-281894, 2007-281901, 2007-281910 and 2007-282301 all filed Oct. 30, 2007, the disclosures of which are incorporated herein by reference in their entirety.

TECHNICAL FIELD

The present invention relates to a mobile display device displaying conversion candidates of input character and a control method in such a mobile display device.

BACKGROUND ART

In a mobile phone etc., a technique of predicting conversion candidates of input character which is input in accordance with an operation at the time of preparation of an e-mail and displaying the predicted conversion candidates together with the input character as conversion candidates in part of a screen is known.

For example, there is proposed a character input device displaying conversion candidates in a predetermined region of a display part at the time of input of character, prompting selection of one of the conversion candidates displayed in the predetermined display region, and deciding on the input character after by input (selection) of a user (see for example Patent Document 1).

Patent Document 1: Japanese Patent Publication (A) No. 2006-209558

DISCLOSURE OF THE INVENTION

Problem to be Solved by the Invention

In this regard, in a conventional mobile phone, it is possible to change a screen so as to let an elderly person or other user who has difficulty recognizing small character easily recognize the character by changing the displayed character to a large display size.

By enlarging the display size of character in this way, the visibility of displayed character is improved. However, the problem arises that the amount of information (length of character) displayed on one screen decreases.

Further, according to the technique disclosed in the above Patent Document 1, the number of candidates which can be displayed in the display region for conversion candidates displayed during input of character ends up decreasing compared with the case of the normal character display size. In this case, the target conversion candidate will not be displayed without a frequent selection operation, therefore a problem arises concerning usability in that the conversion candidate becomes harder to select.

The present invention provides a mobile display device capable of keeping and improving usability and a control method in the mobile display device.

Solution to Problem

A mobile display device of a first aspect of the present invention is provided with an input information acquisition part for acquiring input information, a display part having a first display region and a second display region, and a control part which performs processing for input of a character in accordance with the input information acquired by the input information acquisition part, displays the input character at the input processing in the first display region of the display part, and displays a plurality of conversion candidates of the input character in the second display region of the display part, wherein the control part changes the processing for display of the plurality of conversion candidates in the second display region in accordance with a display size of the conversion candidates displayed in the second display region.

Preferably, the control part changes display priorities of the plurality of conversion candidates in the second display region in accordance with a display size of the conversion candidates displayed in the second display region.

Preferably, the control part sets degrees of priority of display of the conversion candidates depending upon the number of displayable character in the second display region based on the display size of the conversion candidates and each number of character of the plurality of conversion candidates.

Preferably, the control part sets a conversion candidate to be displayed second based on a difference between the number of displayable character in the second display region and the number of character of the conversion candidate displayed first.

Preferably, the control part makes the conversion candidate to be displayed first in the second display region the same conversion candidate irrespective of the display size of the character of the conversion candidates.

Preferably, the control part has a plurality of conversion candidate lists of the pluralities of conversion candidates in accordance with display sizes of the conversion candidates.

Preferably, the control part changes a display area of the second display region in accordance with the display size of the conversion candidates.

Preferably, the control part displays a conversion candidate selected from the plurality of conversion candidates displayed in the second display region in the display part in an enlarged size when the display size of the conversion candidate displayed in the second display region is smaller than the display size of the input character displayed in the first display region.

Preferably, the control part displays the conversion candidate selected from the plurality of conversion candidates in the display part while enlarging its size to the display size of the input character displayed in the first display region.

Preferably, the control part scrolls the conversion candidates when displaying the conversion candidate selected from the plurality of conversion candidates in an enlarged size.

Preferably, the control part suppresses display of a conversion candidate when the display region required for displaying the conversion candidate in the display part in accordance with the display size of the conversion candidate would exceed a predetermined display region.

Preferably, the device has a display mode setting part enabling setting of either of a first display mode in which the plurality of conversion candidates are displayed in a first display size or a second display mode in which the plurality of conversion candidates are displayed in a second display size larger than the first display size, and the control part changes a display form of the conversion candidate selected from the plurality of conversion candidates being displayed in the second display region in accordance with the selection information acquired at the input information acquisition part by selection of the conversion candidate to be selected from the plurality of conversion candidates by a different method in accordance with the display mode selected at the display mode setting part.

Preferably, when the first display mode is set, the control part selects one conversion candidate from the plurality of conversion candidates displayed in the display part in accordance with the predetermined selection information, while when the second display mode is set, it displays in the display part a plurality of conversion candidates which are different from the plurality of conversion candidates displayed in the display part in accordance with the predetermined selection information and selects one conversion candidate from the displayed plurality of conversion candidates.

Preferably, the control part changes a switching speed of the conversion candidate to be selected from the plurality of conversion candidates displayed in the display part in accordance with the selection information in accordance with the display mode set at the display mode setting part.

A control method in a mobile display device of a second aspect of the present invention comprises the steps of acquiring input information, performing processing for input of character in accordance with the acquired input information, displaying the input character of the input processing in a first display region of a display part, displaying a plurality of conversion candidates of the input character of the input processing in a second display region of the display part, and changing processing for display of the plurality of conversion candidates in the second display region in accordance with a display size of the conversion candidates displayed in the second display region.

Advantageous Effect of Invention

According to the present invention, even in a case of changing of the display size of the conversion candidates of input character, usability can be kept and improved.

BRIEF DESCRIPTION OF DRAWINGS

FIG. 4 is a flow chart for explaining an operation of the mobile display device according to the present first embodiment.

FIG. 9A to FIG. 9C are diagrams showing one example of the display screen configuration of the mobile display device according to the present second embodiment.

FIG. 10A to FIG. 10C are diagrams showing another example of the display screen configuration of the mobile display device according to the present second embodiment.

FIG. 12A to FIG. 12C are diagrams showing a still further other example of the display screen configuration of the mobile display device according to the present second embodiment and show an example in which the selected conversion candidate is displayed enlarged in the input character display region in a popup FIG. 13A to FIG. 13C are diagrams showing a still further other example of the display screen configuration of the mobile display device according to the present second embodiment and show an example in which a plurality of conversion candidates displayed in the conversion candidate display region are displayed in the normal font size and the input character displayed in the input character display region is displayed enlarged and character being input is displayed directly rewritten over by a conversion candidate.

FIG. 24A to FIG. 24F are screen transition diagrams of the mobile display device according to the present fifth embodiment.

FIG. 25A to FIG. 25E are other screen transition diagrams of the mobile display device according to the present fifth embodiment.

REFERENCE SIGNS LIST

1 ... mobile phone, 2 ... operation part housing, 2a ... front case, 2b ... rear case, 3 ... display part housing, 3a ... front panel, 3b ... front case, 4 ... connection part, 11 ... communication part, 12 ... operation part (operation key group), 12a ... function set operation keys, 12b ... input operation keys, 12c ... execute operation key, 13 ... audio processing part, 14 ... speaker (audio output part), 15 ... microphone (audio input part), 16 ... display part, 17 ... memory part, 18, 18A to 18D ... control parts, 161 ... input character display region (first display region), and 162 ... conversion candidate character display region (second display region).

BEST MODE FOR CARRYING OUT INVENTION

Below, the best mode for carrying the present invention will be explained with reference to the drawings.

According to FIG. 1, the basic structure of a mobile phone 1 will be explained as a mobile display device having a character input device.

Figure 1:
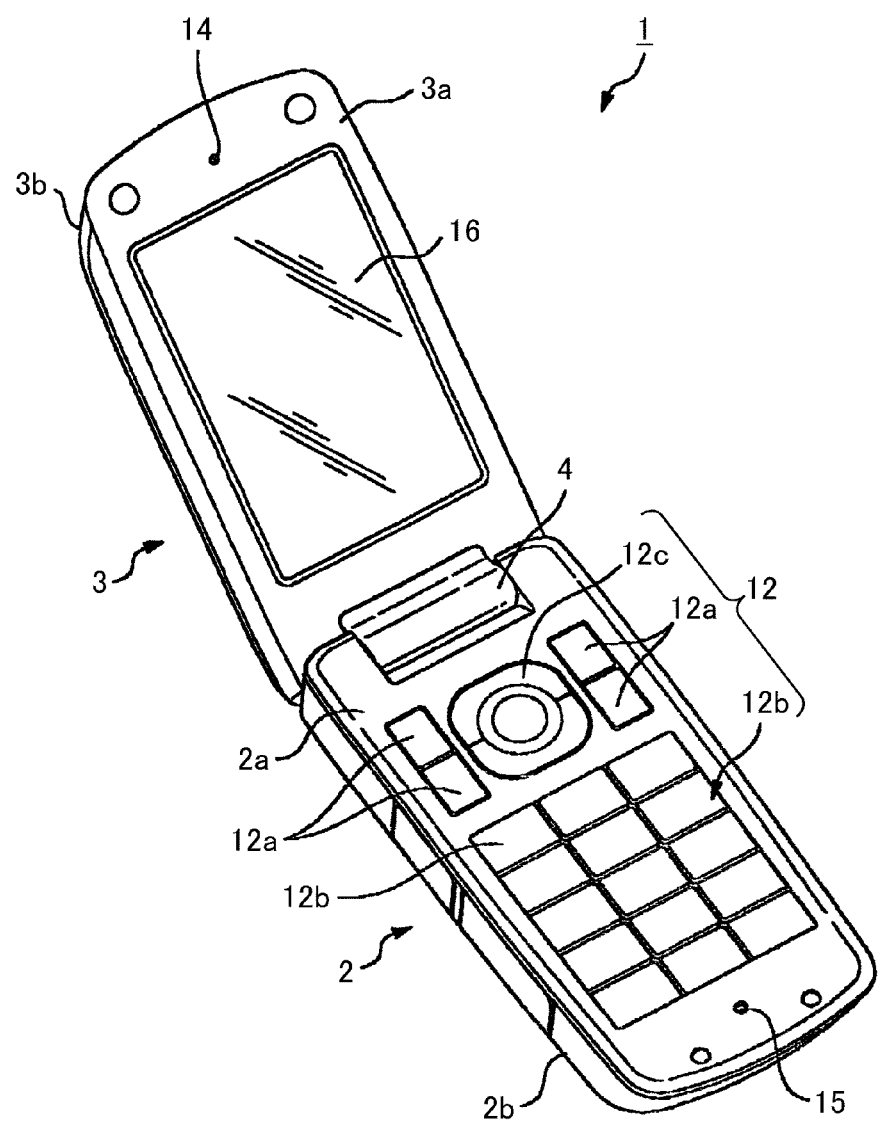
FIG. 1 is a perspective view of an appearance showing an example of a basic structure of a mobile phone according to an embodiment of the present invention.

FIG. 1 shows a perspective view of the appearance in a state where the mobile phone 1 is opened.

As shown in FIG. 1, the mobile phone 1 has an operation part side housing 2 and a display part side housing 3 as the housing. The operation part side housing 2 and the display part side housing 3 are connected through a connection part 4 provided with a hinge mechanism so that opening/closing is possible.

Specifically, an upper end portion of the operation part side housing 2 and a lower end portion of the display part side housing 3 are connected through the connection part 4. Due to this, the mobile phone 1 is configured so that the operation part side housing 2 and the display part side housing 3 connected through the hinge mechanism can be moved relative to each other.

That is, the mobile phone 1 can exhibit a state where the operation part side housing 2 and the display part side housing 3 are open (open state) and a state where the operation part side housing 2 and the display part side housing 3 are folded (closed state).

Here, the "closed state" means a state where the two housings are arranged so that they are superimposed on each other, and the "open state" means a state where the two housings are arranged so that they are not superimposed on each other.

An outer surface of the operation part side housing 2 is formed by a front case 2a and a rear case 2b. In the operation part side housing 2, on the front case 2a side, an operation key group 12 serving as the operation part and an audio input part 15 serving as a microphone to which voice emitted by a user of the mobile phone 1 when speaking is input are formed so that they are exposed.

The operation key group 12 is formed by function set operation keys 12a, input operation keys 12b, and an execute operation key 12c.

The function set operation keys 12a are operated so as to actuate various types of settings and various types of functions such as a telephone book function and mail function.

The input operation keys 12b are operated in order to input numbers of phone numbers, character of mail, etc., and so on.

The execute operation key 12c is operated when executing various types of operations, scrolling in the up/down/left/right directions, and so on.

Each of the keys configuring the operation key group 12 is assigned a predetermined function in accordance with an open/closed state of the operation part side housing 2 and the display part side housing 3 and various modes or a type of started up application etc.

Further, by depression of a key by a user, the operation in accordance with the function assigned to each key is executed.

The audio input part 15 is arranged on an outer end side opposite to the connection part 4 side in a longitudinal direction of the operation part side housing 2. That is, the audio input part 15 is arranged at one outer end side in the state where the mobile phone 1 is open.

On the side surface on one side in the operation part side housing 2, a not shown interface for communicating with an external apparatus (for example, a host controller) is arranged.

On the side surface on the other side of the operation part side housing 2, a side key to which a predetermined function is assigned and a not shown interface into which an external memory is inserted or from which it is taken out are arranged.

The interfaces are covered with caps. The interfaces are covered by the caps when they are not in use.

The outer surface of the display part side housing 3 is formed by a front panel 3a and a front case 3b.

A display part 16 for displaying various types of information and an audio output part 14 serving as a receiver outputting voice of the other party in a call are arranged on the front case 3b in the display part side housing 3 so that these are exposed.

Here, the display part 16 has a liquid crystal panel, a drive circuit driving this liquid crystal panel, and a backlight or other light source part emitting light from the back surface side of this liquid crystal panel.

Figure 2:
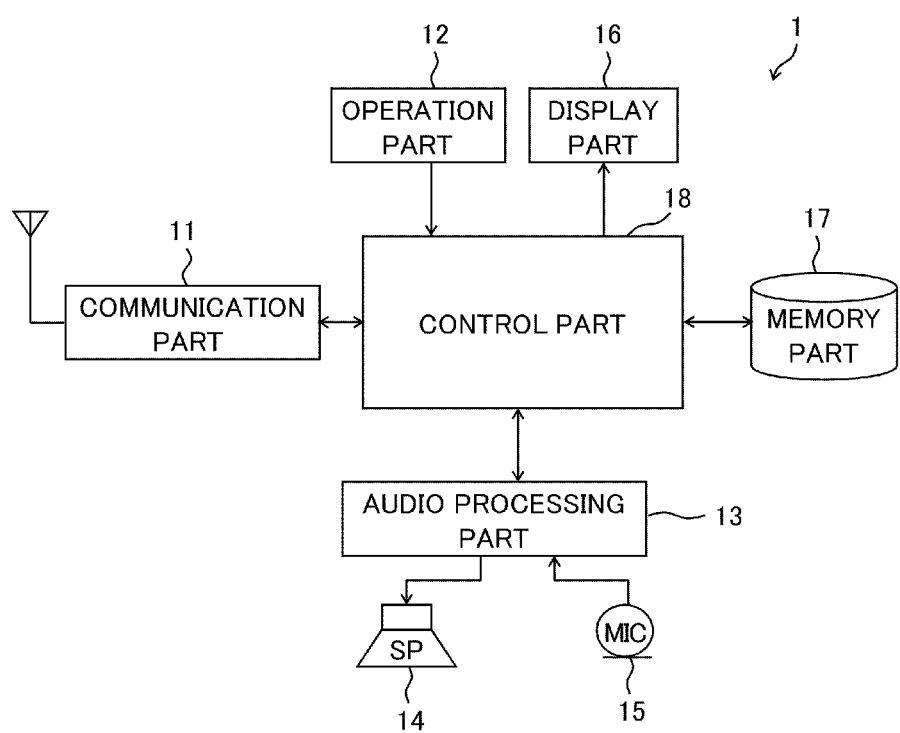
FIG. 2 is a block diagram showing an example of the configuration of a signal processing system of a mobile display device according to an embodiment of the present invention.

FIG. 2 is a block diagram showing an example of the configuration of a signal processing system of the mobile display device according to the embodiment of the present invention. Here, a mobile phone 1 is exemplified as the mobile display device.

As shown in FIG. 2, the mobile phone 1 has a communication part 11, operation part 12, audio processing part 13, speaker 14, microphone 15, display part 16, memory part 17, and control part 18.

The communication part 11 captures a plurality of communication systems and performs wireless communication with a network side apparatus including a base station connected to a not shown mobile communication network according to a communication protocol of, for example, CDMA2000 1x (hereinafter simply referred to as 1x) or EVDO.

Note that, EVDO communication is faster than 1x communication, while 1x communication has the feature of supporting audio communication as well as data communication unlike EVDO communication.

The operation part 12 functions as the input information acquisition part and has, for example, a power key, a speak key, number keys, letter keys, direction keys (up/down/left/right keys), an execute key, a send key, and other keys to which various functions are assigned.

When these keys are operated by the user, the operation part 12 generates signals corresponding to operation contents as acquisition information acquired by the operation and inputs these as an instruction of the user to the control part 18.

Here, the operation part 12 functions as the character input device at the time of preparation of the outgoing mail.

The audio processing part 13 processes the audio signal output from the speaker 14 and the audio signal input at the microphone 15.

Namely, the audio processing part 13 amplifies audio input from the microphone 15, performs analog-to-digital conversion, and further applies encoding or other signal processing to convert the audio to digital audio data and outputs the result to the control part 18.

Further, the audio processing part 13 applies decoding, digital-to-analog conversion, amplification, or other signal processing to the audio data supplied from the control part 18 to convert it to an analog audio signal and outputs the result to the speaker 14.

The display part 16 is configured by using, for example, a liquid crystal display panel, an organic EL (electroluminescence) panel, or other display device and displays an image in accordance with a video signal supplied from the control part 18.

The display part 16 specifically displays a phone number of a destination at the time of a send operation, a phone number of the other party at the time of reception, incoming mail, and outgoing mail and also pictographs such as the date, time, and remaining battery power and further a standby image.

The display part 16 is further divided into regions of a first display region displaying input character in accordance with an operation performed on the operation part 12 at the time of preparation of the outgoing mail and a second display region displaying conversion candidates generated by conversion of the input character by the control part 18 explained later. Each displays an image.

Hereinafter, the first display region will be referred to as an "input character display region 161", and the second display region will be referred to as a "conversion candidate character display region 162".

The memory part 17 stores various types of data utilized for processing executed in the control part 18.

The memory part 17 stores, for example, application programs executed by the control part 18, an address book for managing personal information such as phone numbers and e-mail addresses of other parties in communication, an audio file for playing back an incoming call sound and an alarm sound, various types of setting data, temporary data utilized in the processing process of the programs, and so on.

Figure 3:
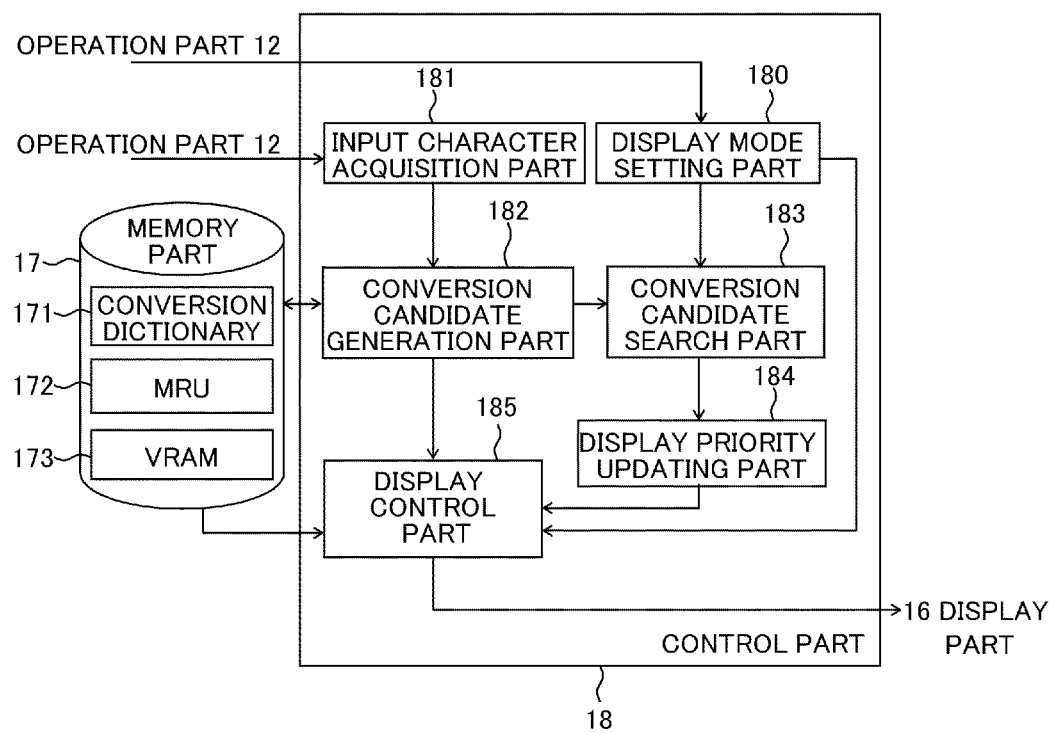
FIG. 3 is a block diagram showing an example of the configuration of a control part according to a first embodiment.

Further, in the memory part 17, as shown in FIG. 3 etc., a conversion dictionary 171 referred to when converting the input character is stored. In the memory part 17, a display priority list of conversion candidates automatically updated based on the most recent use history is stored in an MRU (Most Recently Used Files) region 172. In the memory part 17, two screens' worth of the display data of the above input character display region 161 and conversion candidate character display region 162 are stored in a VRAM (Video RAM) region 173.

Note that, the above memory part 17 is configured by, for example, a nonvolatile memory device (flash memory), random accessible memory device (SRAM, DRAM), or the like.

The control part 18 centrally controls the entire operation of the mobile phone.

Namely, the control part 18 controls operations of the blocks explained above so that various types of processing of the mobile phone 1 are executed in a suitable sequence in accordance with an operation performed with respect to the operation part 12.

Note that, as the various types of processing of the mobile phone 1 controlled by the control part 18, controls of speech carried out through a line exchange network, of preparation and transmission/reception of e-mails, of viewing of Internet web (World Wide Web) sites, and so on may be exemplified.

As the operations of blocks controlled by the control part 18, transmission/reception of signals at the communication part 11, input/output of audio at the audio processing part 13, drawing of images and display in the display part 16, and so on may be exemplified.

The control part 18 is provided with a computer (microprocessor) executing processing based on the programs stored in the memory part 17 and executes the processing explained above according to the sequence instructed in these programs.

Namely, the control part 18 sequentially reads instruction codes from the operating system, application program, and other programs stored in the memory part 17 to execute processing.

The mobile phone 1 serving as the mobile display device according to the present embodiment has the characteristic functions shown below as will be explained in detail as a plurality of embodiments of the control part 18.

The control part 18 performs processing for input of character in accordance with the input information acquired by the operation part 12 serving as the input information acquisition part.

The control part 18 has a function of displaying the input character in this input processing in the input character display region 161 as the first display region of the display part 16 and displaying a plurality of conversion candidates of the input character in the conversion candidate character display region 162 as the second display region of the display part 16.

Further, the control part 18 has a function of changing the display processing of a plurality of conversion candidates of the conversion candidate character display region 162 in accordance with a display size of the conversion candidates displayed in the conversion candidate character display region 162.

Further, the control part 18 has a function of changing display priorities of the plurality of conversion candidates in the conversion candidate character display region 162 in accordance with a display size of the conversion candidates displayed in the conversion candidate character display region 162.

In this case, the control part 18 sets the display priority of the conversion candidates depending upon the number of displayable character of the conversion candidate character display region 162 in accordance with the display size of the conversion candidates and the number of the plurality of conversion candidates.

Further, the control part 18 sets a conversion candidate to be displayed second based on a difference between the number of displayable character of the conversion candidate character display region 162 and the number of character of the conversion candidate displayed first.

Alternatively, the control part 18 has a function of making a conversion candidate displayed first in the conversion candidate character display region 162 the same conversion candidate irrespective of the display size of the character of the conversion candidates.

The control part 18 has a plurality of conversion candidate lists of a plurality of conversion candidates in accordance with the display sizes of the conversion candidates.

Further, the control part 18 has a function of changing a display area of the conversion candidate character display region 162 in accordance with a display size of the conversion candidates.

Furthermore, the control part 18 has a function of displaying a conversion candidate selected from the plurality of conversion candidates displayed in the conversion candidate character display region 162 in the display part 16 in an enlarged size when the display size of the conversion candidates displayed in the conversion candidate character display region 162 is smaller than the display size of the input character displayed in the input character display region 161.

In this case, the control part 18 displays the conversion candidate selected from the plurality of conversion candidates in the display part 16 while enlarging the size to the display size of the input character displayed in the input character display region 161.

Further, the control part 18 scrolls the conversion candidates when a selection candidate selected from the plurality of conversion candidates is displayed in an enlarged size.

The control part 18 has a function of suppressing display of the conversion candidates when the display region required for displaying the conversion candidates in the display part 16 in accordance with the display size of the conversion candidates would exceed a predetermined display region.

Further, the control part 18 may have a display mode setting part which enables setting of either of a first display mode in which a plurality of conversion candidates are displayed in a first display size or a second display mode in which a plurality of conversion candidates are displayed in a second display size larger than the first display size.

In this case, the conversion candidates selected from the plurality of conversion candidates are selected by different methods in accordance with display modes selected at the display mode setting part.

Due to this, the control part 18 changes the processing for display of the conversion candidate selected from the plurality of conversion candidates displayed in the conversion candidate character display region 162 in accordance with the selection information acquired at the input information acquisition part.

When the first display mode is set, the control part 18 selects one conversion candidate from the plurality of conversion candidates displayed in the display part in accordance with the predetermined selection information acquired in accordance with the operation of the direction keys and execute key.

Where the second display mode is set, the control part 18 displays a plurality of conversion candidates in the display part 16 which are different from among the plurality of conversion candidates displayed in the display part 16 in accordance with the predetermined selection information and selects one conversion candidate from among the displayed plurality of conversion candidates.

Further, the control part 18 changes the switching speed of the conversion candidate selected from among the plurality of conversion candidates displayed in the display part 16 in accordance with the selection information in accordance with the display mode set at the display mode setting part.

In this way, in the mobile phone 1 serving as the mobile display device according to the present embodiment, the control part 18 has the characteristic functions explained above.

Below, a plurality of embodiments will be explained in detail focusing on above functions of the control part 18.

First Embodiment

FIG. 3 is a block diagram showing an example of the configuration of the control part 18 according to a first embodiment.

In FIG. 3, only blocks necessary for realizing the function as a character input device of the mobile phone 1 serving as the mobile display device are extracted and shown.

As shown in FIG. 3, the control part 18, in terms of function, has a display mode setting part 180, input character acquisition part 181, conversion candidate generation part 182, conversion candidate search part 183, display priority updating part 184, and display control part 185.

The display mode setting part 180 controls the conversion candidate search part 183 and display control part 185 according to the display mode (enlarged mode/normal mode) instructed by operation at the operation part 12.

The input character acquisition part 181 fetches the input character input by the user operating the operation part 12 and supplies this to the conversion candidate generation part 182.

The conversion candidate generation part 182 acquires a plurality of conversion candidates with reference to a conversion dictionary 171 stored in the memory part 17 based on the input character fetched by the input character acquisition part 181.

The conversion candidate generation part 182 displays these according to orders of priority defined in the conversion candidate character display region of the display part 16 through the display control part 185 with reference to the MRU region 172 for each acquired conversion candidate.

At the time of the enlarged mode serving as the second display mode, for each of the plurality of conversion candidates generated by the conversion candidate generation part 182, the conversion candidate search part 183 compares this with a predetermined character number and outputs conversion candidates having character number matching with the conditions to the display priority updating part 184.

Individually, the predetermined character number is given as, for example, {character length which can be displayed in one row of the conversion candidate character display region 162—character number of conversion candidate displayed first—one blank space}.

The display priority updating part 184 extracts the conversion candidate having the highest priority from among the conversion candidates matching with the above conditions and sequentially instructs the display control part 185 of conversion candidates to be displayed second and on in the conversion candidate character display region 162 of the display part 16.

Namely, the display priority updating part 184 generates new display priority orders of conversion candidates. Here, the display priority list stored in the MRU region 172 of the memory part 17 is updated.

The display control part 185 reads out data to be displayed in the input character display region (first display region) 161 of the display part 16 and the conversion candidate display region (second display region) 162 from the VRAM region 173 of the memory part 17 in synchronization with the display timing of the display device configuring the display part 16. The display control part 185 displays the read out data on the display part 16.

The display control part 185 displays a plurality of conversion candidates generated by the conversion candidate generation part 182 in the conversion candidate character display region 162 of the display part 16 according to degrees of display priority instructed by the display priority updating part 184.

Note that, when the normal mode is designated through the display mode setting part 180, the display control part 185 displays conversion candidates in the conversion candidate character display region 162 of the display part 16 according to the display priority orders defined by the display priority list stored in the MRU region 172 of the memory part 17.

FIG. 4 is a flow chart for explaining the operation of the mobile display device according to the present first embodiment.

Below, linked with the flow chart shown in FIG. 4, the operation of the mobile phone 1 serving as a mobile display device according to the present first embodiment will be explained in detail.

Here, consider preparation of outgoing mail by the mobile phone 1.

First, character is input is by a user operating character keys assigned to the operation part 12 (step S101 "Yes").

Upon receipt of this, the input character acquisition part 181 of the control part 18 converts an input character or input character string to key codes by a key scan etc. and fetches the same (step S102), then supplies this to the conversion candidate generation part 182.

When there is no character input (step S101 "No"), the input character acquisition part 181 waits until character input occurs.

The conversion candidate generation part 182 generates conversion candidates according to for example phonetic kana syllabary/Sino-Japanese ideograph conversion based on the fetched key codes with reference to the conversion dictionary 171 stored in the memory part 17 and supplies the result to the display control part 185 (step S103).

Here, when there are a plurality of conversion candidates, the conversion candidate generation part 182 further refers to the display priority list stored in the MRU region 172 of the memory part 17 and outputs the conversion candidates according to the display priority orders dynamically updated based on past use history.

Note that, here, the conversion candidate which is output with the highest priority and displayed in the first place (first priority) of the conversion candidate character display region 162 of the display part 16 through the display control part 185 is the conversion candidate which is most recently selected in the past (step S104).

Here, it is assumed that the enlarged mode is instructed as the second display mode by the user operating the operation part 12.

The enlarged mode is one of the display modes for the input character. It is a mode in which the input character displayed in the display part 16 along with an input operation of the character is displayed in a font size (second display size) enlarged more than the font size (first display size) of the input character displayed in the normal mode as the first display mode.

The display modes including these normal mode and enlarged mode can be set in advance by performing mode selection from various types of function setting menus.

Further, by setting this enlarged mode, the input character input along with the input operation to the operation part 12 is displayed in the input character display region 161 in the font size enlarged more than the font size (display size) of the input character displayed at the time of setting of the normal mode, thus the visibility can be improved.

Further, when this enlarged mode is set, the conversion candidates of the input character displayed along with the input operation are also displayed in the conversion candidate character display region 162 in a font size enlarged more than the font size of the conversion candidates of the input character displayed in the normal mode.

Here, the enlarged font size is a size equivalent to the font size of the input character displayed in the input character display region 161 in the enlarged mode.

Note that, other than the change of the font size by selection of the display mode, the setting of the font size can be changed by selecting the font size of the input character from an input font size setting menu by the size change function of the input character.

In this case, at the time when a font size (for example, "Large" or "Largest") which is enlarged more than the standard size (for example, "Middle") is set as the font size of the input character, the input character displayed in the input character display region 161 and the conversion candidates displayed in the conversion candidate character display region 162 may be displayed enlarged as well.

Below, an explanation will be given including the state where this enlarged font size is set as the enlarged mode.

At the time of the enlarged mode (step S105 "Enlarge"), the display mode setting part 180 starts up the conversion candidate search processing by the conversion candidate search part 183.

The conversion candidate search processing assumes a case where the number of character configuring the conversion candidate displayed after the conversion candidate previously displayed first is relatively large, so that conversion candidate cannot be displayed completely in one row.

In that case, the processing is carried out assuming change of the display priority orders (degrees of priority) of the conversion candidates displayed second so as to increase the displayable number of the conversion candidate character display region 162 by one page.

For this reason, the conversion candidate search part 183 extracts a conversion candidate having a character length $C=A-B-1$ (note, "1" is one blank space) for which display in the second position is possible by computation for each plurality of conversion candidates output from the conversion candidate generation part 182 and outputs this to the display priority updating part 184 (step S106).

Note, here, "A" is the number of character which can be displayed in one row of the conversion candidate character display region 162, "B" is the number of character of the conversion candidate having the first priority displayed first in the conversion candidate character display region 162, and "1" is one blank space.

Namely, the conversion candidate search part 183 extracts the conversion candidate having the second priority to the conversion candidate having the n−1-th priority (step S107 "Yes") and sequentially searches for conversion candidates having character numbers not more than C in order from the conversion candidates having the higher priorities (step S108).

When the result of the search is that there is one hit, the conversion candidate search part 183 changes the degree of priority by the display priority updating part 184 and displays the second conversion candidate in the conversion candidate character display region 162 of the display part 16 through the display control part 185 (step S109).

Note that, when the normal mode or a reduced mode of display reduced is designated by the processing of step S105, the processing of steps S106 to S108 explained above is skipped.

Further, among the plurality of conversion candidates generated by the conversion candidate generation part 182, the second and following conversion candidates are displayed in the conversion candidate character display region 162 of the display part 16 according to the priority orders defined in the display priority list stored in an MRU region 172 of the memory part 17 by the display control part 185.

Figure 5A:
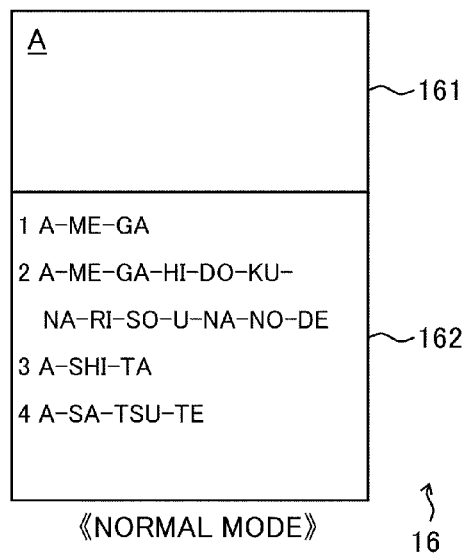
FIG. 5A to FIG. 5D are diagrams showing one example of a display screen configuration of a character input device according to the present first embodiment compared with comparative examples.
Figure 5B:
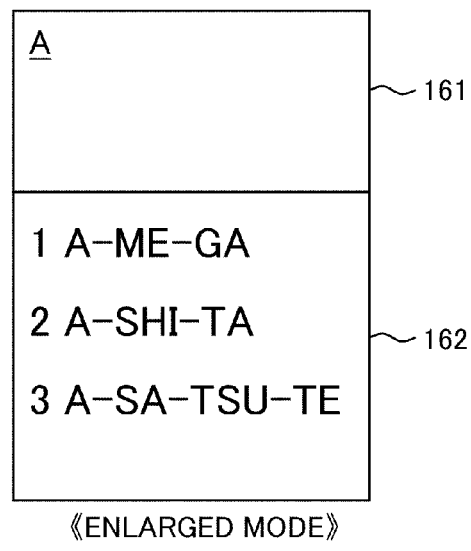

FIG. 5A to FIG. 5B are views showing one example of the display screen configuration generated by the control of the control part 18 of the present first embodiment. FIG. 5A shows an example of the display screen configuration at the time of the normal mode, and FIG. 5B shows an example of the configuration at the time of the enlarged mode. In both figures, the input character display region is indicated by the notation 161, and the conversion candidate display region is indicated by the notation 162.

As shown in FIG. 5B, at the time of the enlarged mode, by changing the display priority orders of the conversion candidates, three conversion candidates can be displayed in the conversion candidate character display region 162.

Figure 5C:
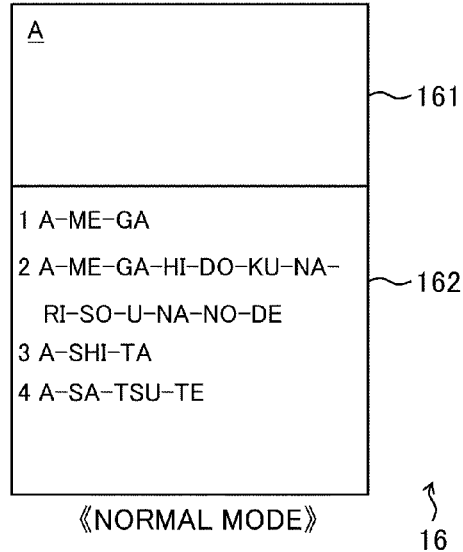
Figure 5D:
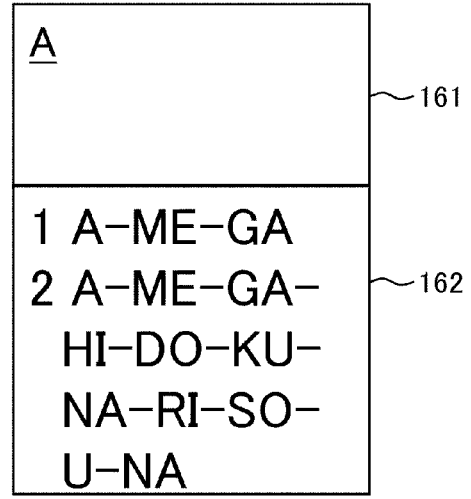

Incidentally, FIG. 5C and FIG. 5D show examples of the display screen configuration at the time of the normal mode and the time of the enlarged mode in a comparative example for comparison.

The priority order is not changed at the time of the enlarged mode of FIG. 5D. Therefore, it is seen that only conversion candidates up to the second conversion candidate (two) are displayed in the conversion candidate character display region 162.

Note that, in the mobile display device according to the present first embodiment described above, the explanation was given assuming that the input character display region 161 and the conversion candidate character display region 162 had substantially the same capacities (display regions) irrespective of the set display mode.

Figure 6A:
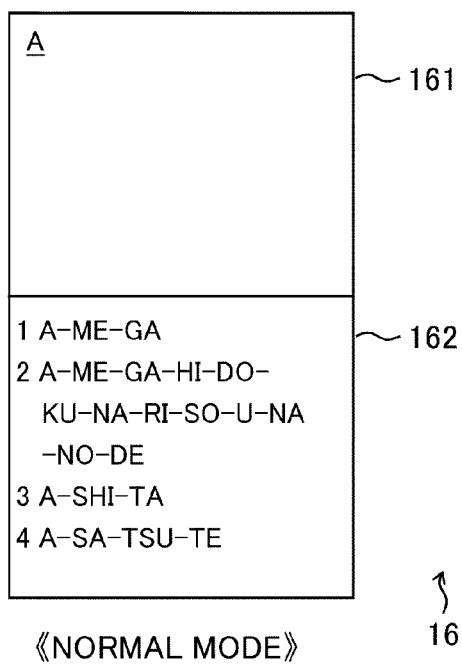
FIG. 6A and FIG. 6B are diagrams showing another example of the display screen configuration of the character input device according to the present first embodiment.
Figure 6B:
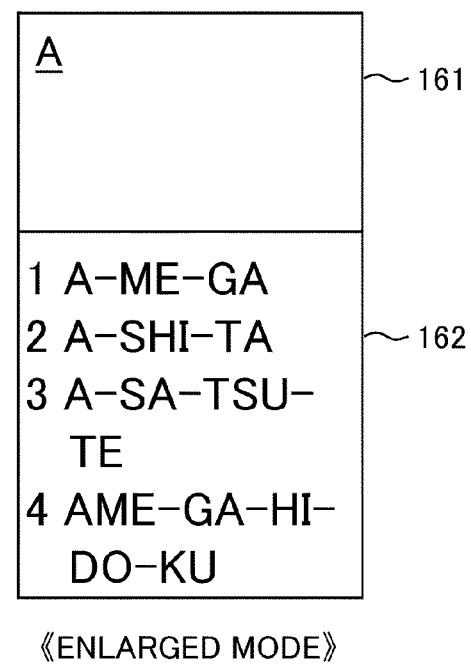

However, for example, as shown in FIG. 6A and FIG. 6B as one example of the screen configuration, at the time of the enlarged mode in FIG. 6B, the conversion candidate character display region 162 may be increased in size compared with that at the time of the normal mode. In this case, the display region of the conversion candidate character display region 162 is increased in size. Therefore, even when the font size is enlarged, decrease of the number of displayed character can be suppressed.

The increase of size of the conversion candidate character display region 162 can be realized by control of the two screens by the display control part 185 instructed to display the enlarged mode by the display mode setting part 180.

As explained above, according to the mobile display device according to the present first embodiment, the control part 18 can select the first display mode (normal mode) displaying conversion candidates of the input character to be displayed in the conversion candidate character display region 162 serving as the second display region of the display part 16 by the first font size and the second display mode (enlarged mode) displaying conversion candidates of the input character to be displayed in the conversion candidate character display region 162 by the second font size enlarged more than the first font size.

The control part 18 has a function of setting degrees of display priority of the plurality of conversion candidates to be displayed in the conversion candidate character display region 162 in the first display mode and degrees of display priority of the plurality of conversion candidates to be displayed in the conversion candidate character display region 162 in the second display mode so that these differ from each other.

Namely, the control part 18 follows the priority orders defined in the display priority list stored in the MRU region 172 of the memory part 17 in the first display mode (normal mode).

Further, the control part 18 displays a plurality of conversion candidates generated at the conversion candidate generation part 182 in the conversion candidate character display region 162 of the display part 16.

The control part 18 displays a plurality of conversion candidates in the conversion candidate character display region 162 of the display part 16 according to the priority orders updated by the display priority updating part 184 in the second display mode (enlarged mode).

Further, at this time, the control part 18 sets the conversion candidates to be displayed first in the normal mode and in the enlarged mode to the same.

Further, the control part 18 changes the degrees of display priority of the conversion candidates to be displayed second and on according to need by the conversion candidate search part 183 and display priority updating part 184 and increases the displayable number's worth of one page of the conversion candidate character display region 162.

Specifically, when the enlarged mode is set through the display mode setting part 180, the conversion candidate search part 183 finds a difference between the length of displayable character in the conversion candidate character display region 162 of the display part 16 and the number of character of the conversion candidate displayed first and determines the conversion candidates to be displayed second and on based on this difference by cooperation with the display priority updating part 184.

In this way, according to the character input device of the present invention, when the font size of the conversion candidates of the input character displayed is enlarged, a decrease of the displayed number of conversion candidates displayed in the conversion candidate character display region 162 can be suppressed.

Therefore, usability can be kept and improved even in the case where the font size is enlarged.

In particular, the obtained effect is large in a case where a function of restricting the menu display and function settings of the mobile phone or changing the function settings or the like so as to switch the operation mode to a specific mode (for example, "simple mode") tailored to elderly persons or kids or the lifestyle of a user is provided.

For example, the obtained advantageous effect is large if the above function is activated along with the enlargement of font size in a case where the font size of the input character and conversion candidates displayed is switched by switching to the specific mode.

The above function is not limited to switching to a mode depending upon the style of use by the user and may also be executed by a change of mode or change of font size using a sub menu during character input.

Further, the above function may also be activated when a specific mode in accordance with the style of use by the user is detected. At this time, a dictionary for the specific mode may be held in the memory part 17 and used.

Further, a method of control of conversion of character input of the present first embodiment has, for example, as shown in the flow chart of FIG. 4, a first step (S101, S102) of fetching the input character in accordance with an operation with respect to the operation part 12, a second step (S103) of generating one or more conversion candidates for the input character, and a third step (S104 to S109) of displaying a plurality of conversion candidates for the character input in the second display region.

Further, the degrees of display priority of one or more conversion candidates to be displayed in the second display region of the display part 16 are set so as to differ between the first display mode and the second display mode.

According to such a method of control of conversion of the input character of the first embodiment, the degrees of the display priority of one or more conversion candidates to be displayed in the second display region in the first display mode and the degrees of the display priority of one or more conversion candidates to be displayed in the second display region in the second display mode are set so as to be different. Due to this, when the font size of the conversion candidates of the input character to be displayed is enlarged, a decrease of the display number of conversion candidates displayed in the conversion candidate character display region 162 can be suppressed.

Therefore, even when a conversion candidate having a relatively large character number exists, improvement of operability can be achieved without affecting the display of the other conversion candidates.

Note that, according to the mobile display device according to the present first embodiment explained above, the display priority of conversion candidates of the input character to be displayed in the conversion candidate character display region 162 is changed between the first display mode (normal mode) and the second display mode (enlarged mode).

Further, conversion candidates to be displayed in the second position and on in the second display mode are determined in accordance with the difference between the number of the displayable character in the conversion candidate character display region 162 of the display part 16 and the number of character of the conversion candidate displayed first.

However, the mobile display device in the present first embodiment is not limited to this configuration.

For example, it is also possible to configure the device so that the degrees of display priority of the conversion candidates are changed so that the number of display of conversion candidates displayed in the conversion candidate character display region 162 in the second display mode (enlarged mode) becomes larger compared with the case where conversion candidates are displayed in the second display mode (enlarged mode) according to the same display priorities as the display priorities of conversion candidates in the first display mode (normal mode) (see FIG. 5(D)).

Second Embodiment

Next, a second embodiment of the mobile display device will be explained.

Figure 7:
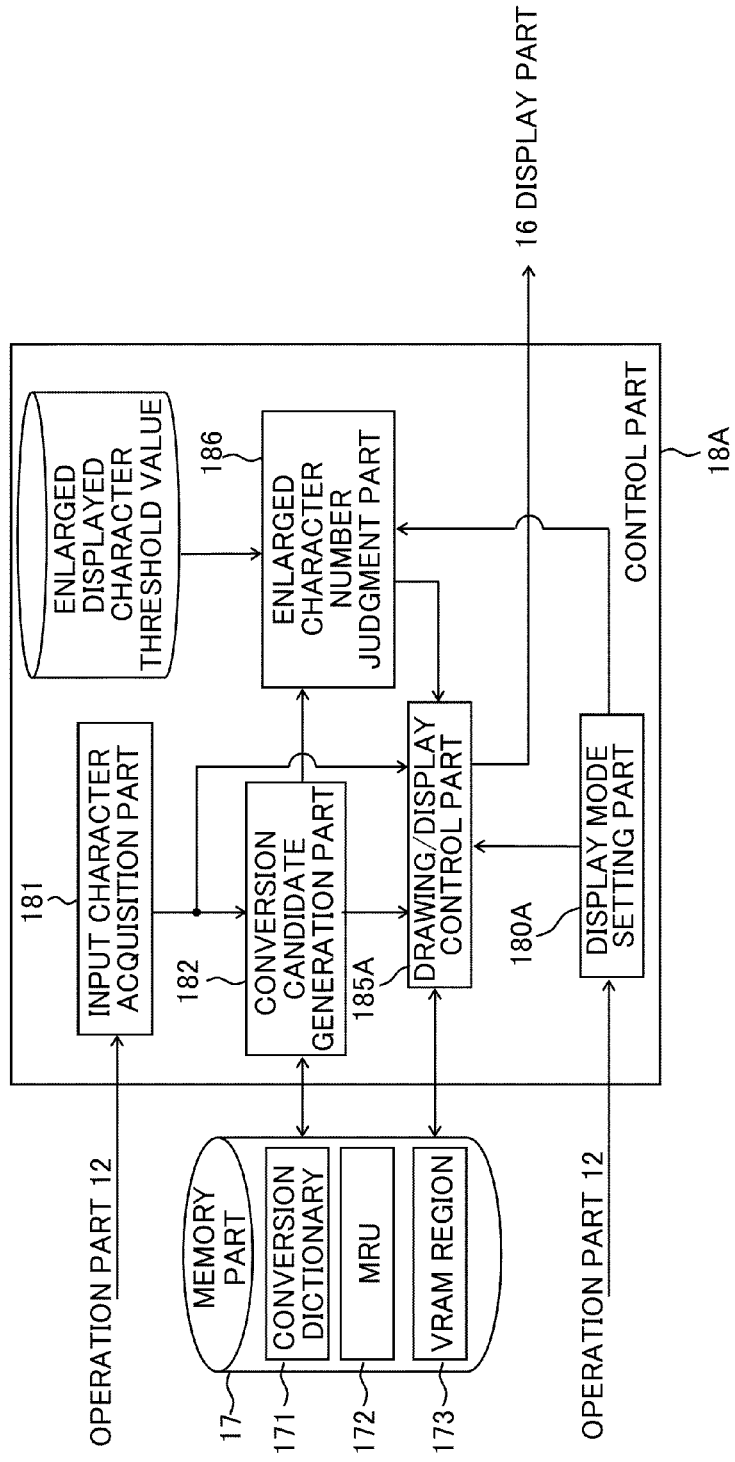
FIG. 7 is a block diagram showing an example of the configuration of a control part according to a second embodiment.

FIG. 7 is a block diagram showing an example of the configuration of a control part 18A according to the second embodiment.

In FIG. 7, for facilitating understanding, components similar to those in the control part 18 of FIG. 3 are represented by the same notations.

As shown in FIG. 7, the control part 18A has a display mode setting part 180A, input character acquisition part 181, conversion candidate generation part 182, drawing/display control part 185A, and enlarged character number judgment part 186.

The control part 18A according to the present second embodiment is configured so that it can set an enlarged mode (first mode) displaying enlarged the input character which is displayed in the input character display region 161 (first display region) by a first font size larger than the font size (display size) of the plurality of conversion candidates of the input character displayed in the conversion candidate character display region 162 (second display region) and an enlargement suppression mode (second mode) displaying this input character by a second font size smaller than the first font size.

In the case where the enlarged mode is set, if one conversion candidate is selected from a plurality of conversion candidates, the control part 18A enlarges this selected one conversion candidate and displays it in the conversion candidate character display region 162 of the display part 16.

Note that, the "enlarged mode" referred to here is a mode displaying the input character by a first font size so as to improve the visibility of the input character and displaying a plurality of conversion candidates of the input character by a second font size so as to secure a certain number of conversion candidates which can be displayed in the conversion candidate character display region 162.

Further, the second font size may be a font size larger or smaller than the character of the plurality of conversion candidates or the same font size.

The display mode setting part 180A sets and manages either of the enlarged mode or enlargement suppression mode based on a setting operation by the operation part 12 and controls the drawing by the drawing/display control part 185A according to the enlarged mode or enlargement suppression mode set here.

The input character acquisition part 181 fetches the input character input by the user performing the character input operation at the operation part 12 and supplies this to the conversion candidate generation part 182.

The conversion candidate generation part 182 acquires a plurality of conversion candidates with reference to the conversion dictionary 171 stored in the memory part 17 based on the input character fetched by the input character acquisition part 181.

The conversion candidate generation part 182 refers to the MRU region 172 for each acquired conversion candidate and displays a plurality of conversion candidates according to the priority orders defined in the conversion candidate character display region 162 of the display part 16 through the drawing/display control part 185A.

The drawing/display control part 185A divides the display part 16 to two screens so that the input character fetched by the input character acquisition part 181 and a plurality of conversion candidates generated by the conversion candidate generation part 182 can be individually displayed in the input character display region 161 and the conversion candidate character display region 162 and draws (writes) these in the VRAM region 173 of the memory part 17.

Further, these are read out and displayed in the display part 16 in synchronization with the display timing of the display device configuring the display part 16.

When the enlarged mode is set at the display mode setting part 180A, if one conversion candidate is selected from a plurality of conversion candidates by the operation part 12, the drawing/display control part 185A displays this selected one conversion candidate in the conversion candidate character display region 162 of the display part 16 in the enlarged size.

In this case, the selected one conversion candidate may be displayed enlarged in the conversion candidate character display region 162 by a first font size which is the same size as that of the input character displayed in the input character display region 161 of the display part 16.

The enlarged character number judgment part 186 is started up in operation when the enlarged mode is set at the display mode setting part 180A.

Namely, the enlarged character number judgment part 186 manages an enlarged character display threshold value defined in order to judge whether a display region required for enlarging the conversion candidates generated by conversion of the input character and displaying these in the conversion candidate character display region 162 of the display part 16 exceeds a predetermined display region.

Here, the enlarged character number judgment part 186 compares the character number of the conversion candidate and the enlarged character display threshold value for each selected conversion candidate and controls scrolling by the drawing/display control part 185A based on the result.

Here, for example, assume eight letters or symbols as the enlarged character display threshold value.

The drawing/display control part 185A performs the next display control in a case of judgment at the enlarged character number judgment part 186 that a display region required for displaying one enlarged displayed conversion candidate in the conversion candidate character display region 162 of the display part 16 exceeds a predetermined display region.

Namely, the drawing/display control part 185A scrolls the one enlarged displayed conversion candidate within a range of the display region required for displaying it in the conversion candidate character display region 162 of the display part 16.

Note that, the functions provided in the blocks 180A, 181, 182, 185A, and 186 of FIG. 7 described above are achieved by executing programs stored in the memory part 17 at the control part 18A.

Further, the functions of blocks do not only indicate blocks substantially differentiated from other blocks and built-in the control part 18A. The processing parts are separately expressed just for simplification of the explanation.

Figure 8:
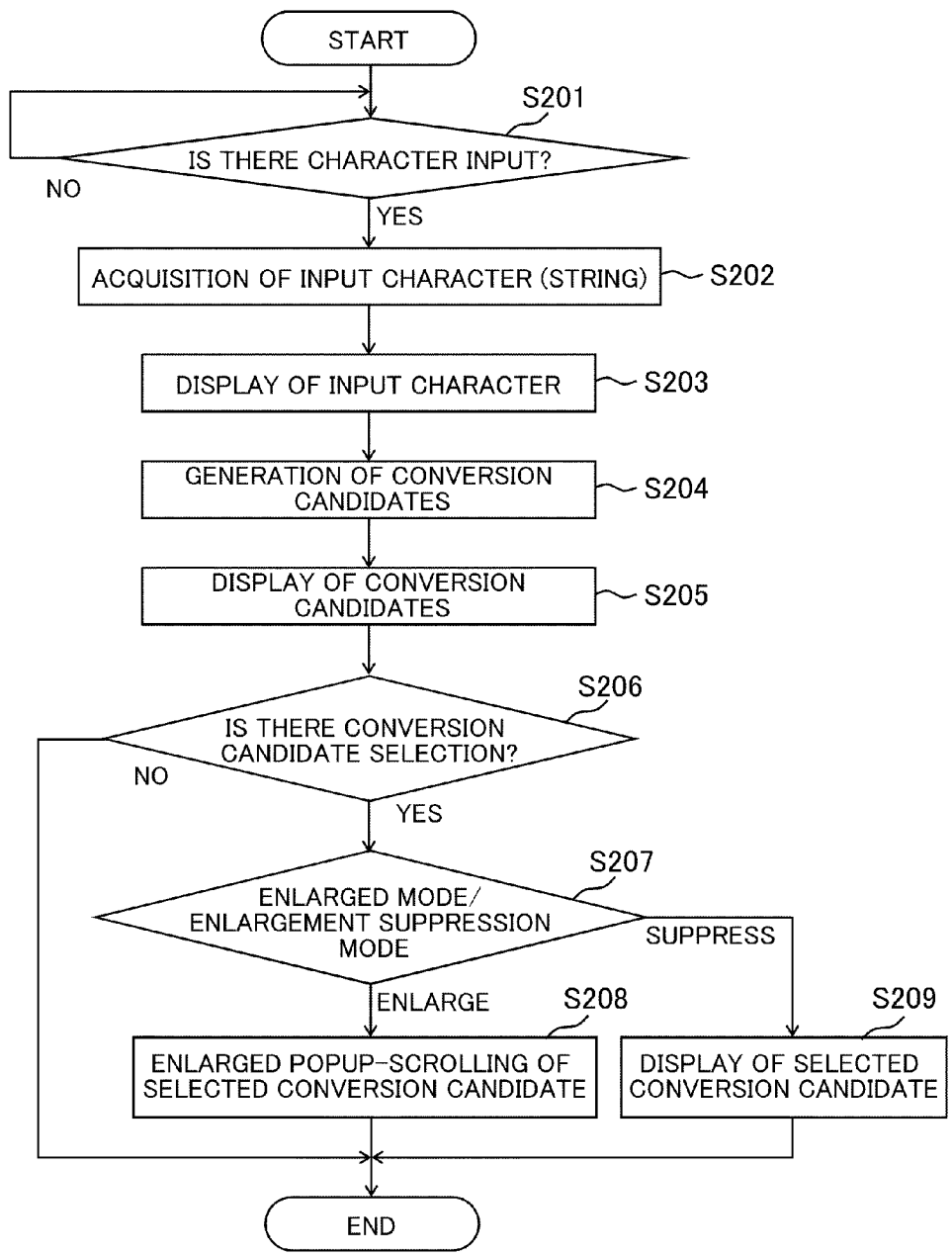
FIG. 8 is a flow chart for explaining the operation of the mobile display device according to the present second embodiment.

FIG. 8 is a flow chart for explaining the operation of the mobile display device according to the present second embodiment.

Below, a detailed explanation will be given of the operation of the mobile display device according to the present second embodiment with reference to the flow chart shown in FIG. 8.

Further, in making the explanation, FIG. 9A to FIG. 9C and FIG. 10A to FIG. 10C will be referred to.

FIG. 9A to FIG. 9C are views showing one example of the display screen configuration of the mobile display device according to the present second embodiment.

FIG. 10A to FIG. 10C are views showing another example of the display screen configuration of the mobile display device according to the present second embodiment.

At the time of preparation of outgoing mail by the mobile phone 1, the user performs a character input operation operating the character keys assigned to the operation part 12 so as to input the character (step S201 "Yes").

Upon receipt of this, the input character acquisition part 181 of the control part 18A converts the input character or input string of character to key codes by a key scan etc. and fetches the result (step S202), supplies these to the drawing/display control part 185A to display the same in the input character display region 161 of the display part 16, and supplies the same to the conversion candidate generation part 182 (step S203).

On the other hand, when there is no character input (step S201 "No"), the input character acquisition part 181 waits until character input occurs.

The conversion candidate generation part 182 refers to the conversion dictionary 171 stored in the memory part 17 based on the fetched key codes, generates conversion candidates by for example phonetic kana syllabary/Sino-Japanese ideograph conversion, and supplies the result to the drawing/display control part 185A (step S204).

The drawing/display control part 185A displays these conversion candidates in the conversion candidate character display region 162 of the display part 16 (step S205).

Here, when there are a plurality of conversion candidates, the conversion candidate generation part 182 further refers to the MRU region 172 stored in the memory part 17 and outputs the conversion candidates according to the display priority orders automatically updated based on the past use history.

Note that, the conversion candidate output with the highest priority here is the conversion candidate most recently selected by the user.

Next, in the state where a plurality of conversion candidates are displayed in the conversion candidate character display region 162 of the display part 16 as described above, assume that one conversion candidate is selected by the user operating the operation part 12 (step S206 "Yes").

At this time, when the enlarged mode is set by the display mode setting part 180A (step S207 "Enlarge"), the drawing/display control part 185A enlarges the selected conversion candidate and displays this popped up by a balloon frame as shown in for example FIG. 9A to FIG. 9C as one example of the display screen configuration thereof (step S208).

In this way, when one conversion candidate is selected from among a plurality of conversion candidates, the one conversion candidate is displayed enlarged, therefore the visibility of the selected conversion candidate can be improved without decreasing the number of display of conversion candidates which can be displayed in the conversion candidate character display region 162 of the display part 16.

Further, the enlarged character number judgment part 186 manages an enlarged character display threshold value as described above. Here, for each selected conversion candidate, the number of character provided in that conversion candidate and the enlarged character display threshold value are compared.

When it is judged that the number of character configuring the conversion candidate exceeds the enlarged character display threshold value, the drawing/display control part 185A may scroll the enlarged conversion candidate in a balloon frame as well as shown in, for example, the example of display screen configuration of FIG. 10A to FIG. 10C (step S208).

In the example shown in FIG. 10A to FIG. 10C, the selected conversion candidate "A-ME-GA-SHI-TO-SHI-TO-FU-RU (RAIN SOFTLY FALLS)" is equal to the enlarged character display threshold value of "8". Therefore, other than enlargement, the selected conversion candidate is further emphasized by scrolling.

For this reason, the visibility of the selected conversion candidate can be improved.

On the other hand, when the enlargement suppression mode is set by the display mode setting part 180A (step S207 "Suppress"), the drawing/display control part 185A does not perform enlarged display as in the enlarged mode, but displays that one conversion candidate even in a case where one conversion candidate is selected from among a plurality of conversion candidates (step S209).

Note that, the above popup display by the enlarged character or he scrolling is realized by the drawing/display control part 185A updating the display data of two screens drawn in the VRAM region 173 of the memory part 17, that is, the input character display region 161 and conversion candidate character display region 162, one after another.

FIG. 11 to FIG. 13 are views showing still another example of the display screen configuration of the mobile display device according to the present second embodiment.

Figure 11A:
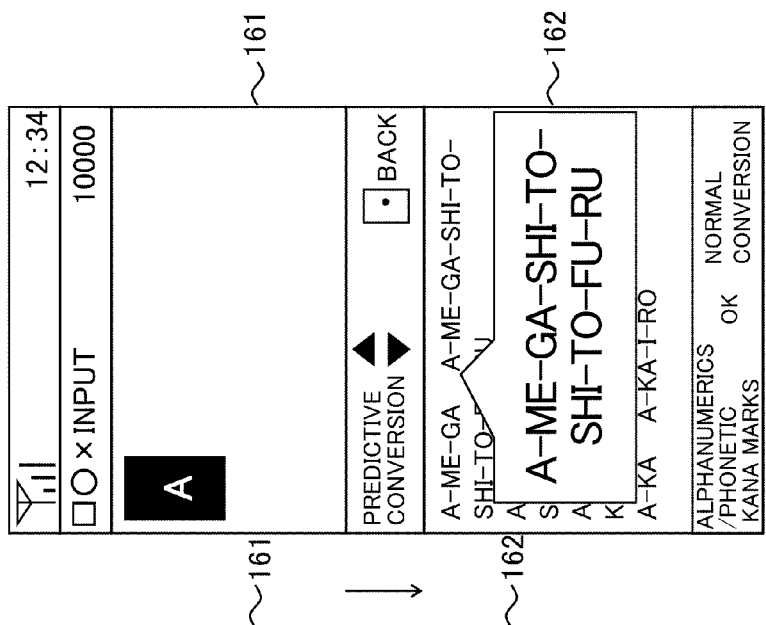
FIG. 11A to FIG. 11C are diagrams showing still another example of the display screen configuration of the mobile display device according to the present second embodiment and show an example in which a plurality of conversion candidates displayed in a conversion candidate display region are displayed in a normal font size, and only a portion of the conversion candidates at which a cursor of the conversion candidate is positioned is displayed enlarged in a balloon frame.
Figure 11B:
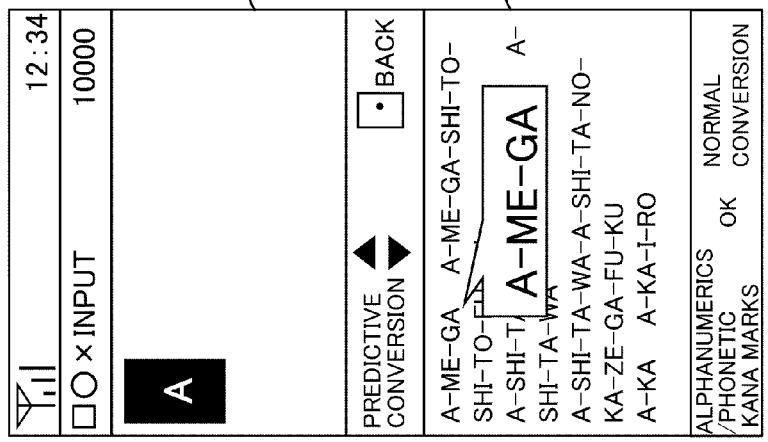
Figure 11C:
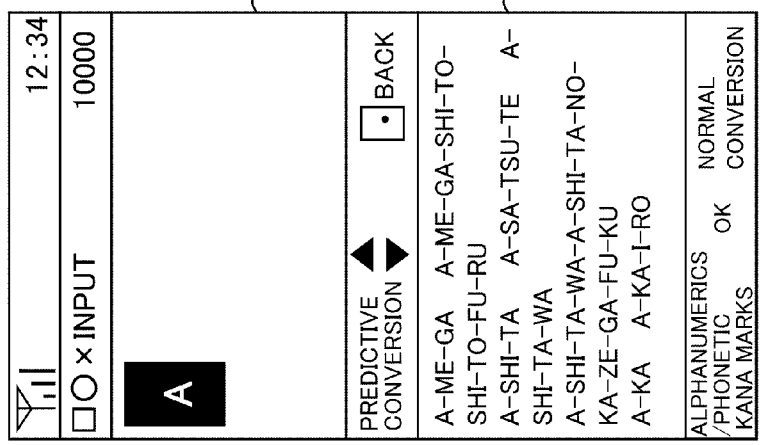

The example of the display screen configuration shown in FIG. 11A to FIG. 11C is an example in which a plurality of conversion candidates displayed in the conversion candidate character display region 162 are displayed by the normal font size, and only a portion of the conversion candidates at which the cursor is positioned is displayed enlarged in a balloon frame.

Further, the example of the display screen configuration shown in FIG. 12A to FIG. 12C is an example in which the selected conversion candidate is displayed popped up and enlarged in the input character display region 161.

Further, the example of the display screen configuration shown in FIG. 13A to FIG. 13C is an example in which a plurality of conversion candidates displayed in the conversion candidate character display region 162 are displayed by the normal font size, and the input character displayed in the input character display region 161 is displayed enlarged and the character during input is directly displayed rewritten over by the conversion candidate.

The display forms described above are configured so that selection is possible by the user operating the operation part 12.

As explained above, according to the mobile display device according to an embodiment of the present invention, when an enlarged mode (first mode) is set by the display mode setting part 180A, the visibility of the input character is kept, while if one conversion candidate is selected from among the plurality of conversion candidates, that one conversion candidate is displayed enlarged. Therefore, the visibility of the selected conversion candidate can be improved without decreasing the number of display of the conversion candidates which can be displayed in the conversion candidate character display region 162 of the display part 16.

Further, the control method in the mobile display device according to the embodiment of the present invention has, for example, in the flow chart of FIG. 8, a first step of fetching the input character by the operation part 12 and displaying the fetched input character in the first display region of the display part 16 (S201 to S203).

Furthermore, the control method of the second embodiment has a second step of converting the input character, generating a plurality of conversion candidates, and displaying these in the second display region of the display part 16 (S204, S205) and a third step of displaying enlarged the selected one conversion candidate in the second display region of the display part 16 if one conversion candidate is selected from a plurality of conversion candidates when the first mode is set (S206 to S208).

According to the control method in a mobile display device according to the present second embodiment, when the enlarged mode (first mode) is set, the input character is displayed by a first font size larger than the font size of the plurality of conversion candidates, therefore the visibility of the input character is improved, while when one conversion candidate is selected from among a plurality of conversion candidates, that one conversion candidate is displayed enlarged.

For this reason, the font size by which the input character is displayed does not exert an influence upon the display of the other conversion candidates compared with the enlargement suppression mode, so the usability is kept and improved.

In particular, when a mobile phone is provided with a specific function of restricting the menu display and function settings or changing the function settings or the like so as to improve usability for elderly persons and kids, the device may be configured so that the device is set to the first mode along with this function being set.

Due to this, just by setting a specific function, a mobile phone not only convenient for an elderly person or kid, but also improved in visibility of character displayed in the display part 16 is suitably provided.

The above function is not limited to mode switching depending upon the style of use of the user and may be changed by using a sub menu during input of character as well.

Further, the above function may be activated when detecting a specific mode in accordance with the style of use of the user, and a dictionary for the specific mode may be held in the memory part 17 and used at this time.

For example, in the specific mode of a "bilingual mode", an English vocabulary registration dictionary is held.

In a specific function intending simplicity, an ordinary dictionary, a user registered dictionary, a dictionary registered by customization by download, etc. are held.

In a "kid's mode", a kid's dictionary with a relatively small number of terms is held, while in a "papa/mama mode", an ordinary dictionary and user registered dictionary are held and so on.

Third Embodiment

Next, a third embodiment of the mobile display device will be explained.

Figure 14:
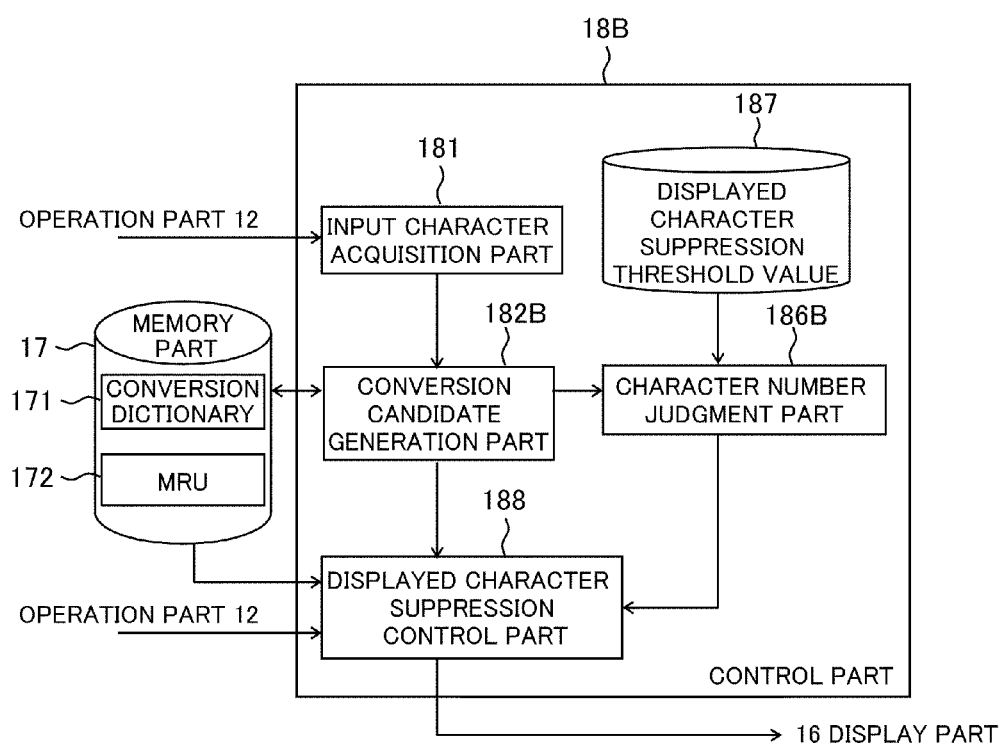
FIG. 14 is a block diagram showing an example of the configuration of a control part according to a third embodiment.

FIG. 14 is a block diagram showing an example of the configuration of a control part 18B according to the third embodiment.

In FIG. 14, for facilitating understanding, components similar to those in the control parts 18 and 18A in FIG. 3 and FIG. 7 are represented by the same notations.

As shown in FIG. 14, the control part 18B has an input character acquisition part 181, conversion candidate generation part 182B, character number judgment part 186B, displayed character suppression threshold value 187, and displayed character suppression control part 188.

The control part 18B according to the present third embodiment displays the character input by the operation part 12 in the input character display region 161 as the first display region of the display part 16.

The control part 18B performs control for suppressing display of a conversion candidate when the region (display region) which is necessary for displaying the conversion candidate of the input character in the conversion candidate character display region 162 serving as the second display region of the display part 16 would exceed a predetermined region.

The control part 18B is further configured so that it can set a first mode (normal mode) displaying the input character to be displayed in the input character display region and conversion candidates of the input character to be displayed in the conversion candidate character display region by a first font size and a second display mode (enlarged mode) displaying the conversion candidates of the input character by a font size larger than the first font size.

Note that, limited to the case of setting to the enlarged mode, the control part 18B may be configured so as to suppress display of a conversion candidate when a region required for displaying the conversion candidate of the input character in the conversion candidate character display region 162 of the display part 16 would exceed a predetermined region as well.

That is, the control part 18B may be configured, in a case where set to not the enlarged mode, but the normal mode, so that display of a conversion candidate is not suppressed even when a region required for displaying the conversion candidate of the input character in the conversion candidate character display region 162 of the display part 16 would exceed a predetermined region.

The input character acquisition part 181 fetches the input character input by the user operating the operation part 12 and supplies this to the conversion candidate generation part 182B.

The conversion candidate generation part 182B generates one or more conversion candidates with reference to the conversion dictionary 171 stored in the memory part 17 based on the input character fetched by the input character acquisition part 181.

Further, the conversion candidate generation part 182B displays conversion candidates generated in this way according to the priority orders defined in the conversion candidate character display region 162 of the display part 16 through the displayed character suppression control part 188 while referring to the MRU region 172.

The character number judgment part 186B manages the displayed character suppression threshold value 187 defined in order to judge whether the region required for displaying a conversion candidate generated by the conversion candidate generation part 182B in the conversion candidate character display region 162 of the display part 16 would exceed a predetermined region.

The character number judgment part 186B compares the conversion candidates generated and output by the conversion candidate generation part 182B with this displayed character suppression threshold value and controls the displayed character suppression control part 188 based on the result.

Note that, the displayed character suppression threshold value 187 is the number of letters or symbols which can be displayed per row of the conversion candidate character display region, for example, is set to nine letters or symbols in the specific mode accompanied with the enlarged display of character.

Note, the displayed character suppression threshold value 187 is not limited to the number of letters or symbols and may be a predetermined display area in the conversion candidate character display region 162 as well.

The displayed character suppression control part 188 suppresses the character display of a conversion candidate when the region required for displaying the conversion candidate generated by conversion of the input character by the conversion candidate generation part 182B in the conversion candidate character display region 162 of the display part 16 would exceed a predetermined region (displayed character suppression threshold value).

Here, "suppression of character display" means control performed so as not to display conversion candidate character (10th and following letters or symbols) corresponding to the length of exceeded character in a case where the number of character configuring the conversion candidate is larger than, for example, the nine letters or symbols which can be displayed in one row of the conversion candidate character display region of the display part 16.

At this time, the displayed character suppression control part 188 suppresses character display of the conversion candidate and displays as a note that suppression is performed by for example a paragraph return mark, an arrow mark, or other icon.

Further, in the state where display of character of a conversion candidate is suppressed as described above, if this conversion candidate is selected for conversion of the input character, the displayed character suppression control part 188 releases the character display suppression of this conversion candidate and displays that conversion candidate, for example, the conversion candidate including also the part of character of the conversion character relating to the part exceeding the displayed character suppression threshold value, in the conversion candidate character display region.

Further, when there are a plurality of conversion candidates generated as the result of conversion of the input character, the displayed character suppression control part 188 suppresses character display of any conversion candidate among the plurality of conversion candidates for which a display region required for display in the conversion candidate character display region of the display part 16 would exceeds a predetermined display region.

Further, when there is a single conversion candidate generated as a result of conversion of the input character, the displayed character suppression control part 188 performs control so as not to suppress the character display of the single conversion candidate even when the required display region would exceed the predetermined display region.

Figure 15:
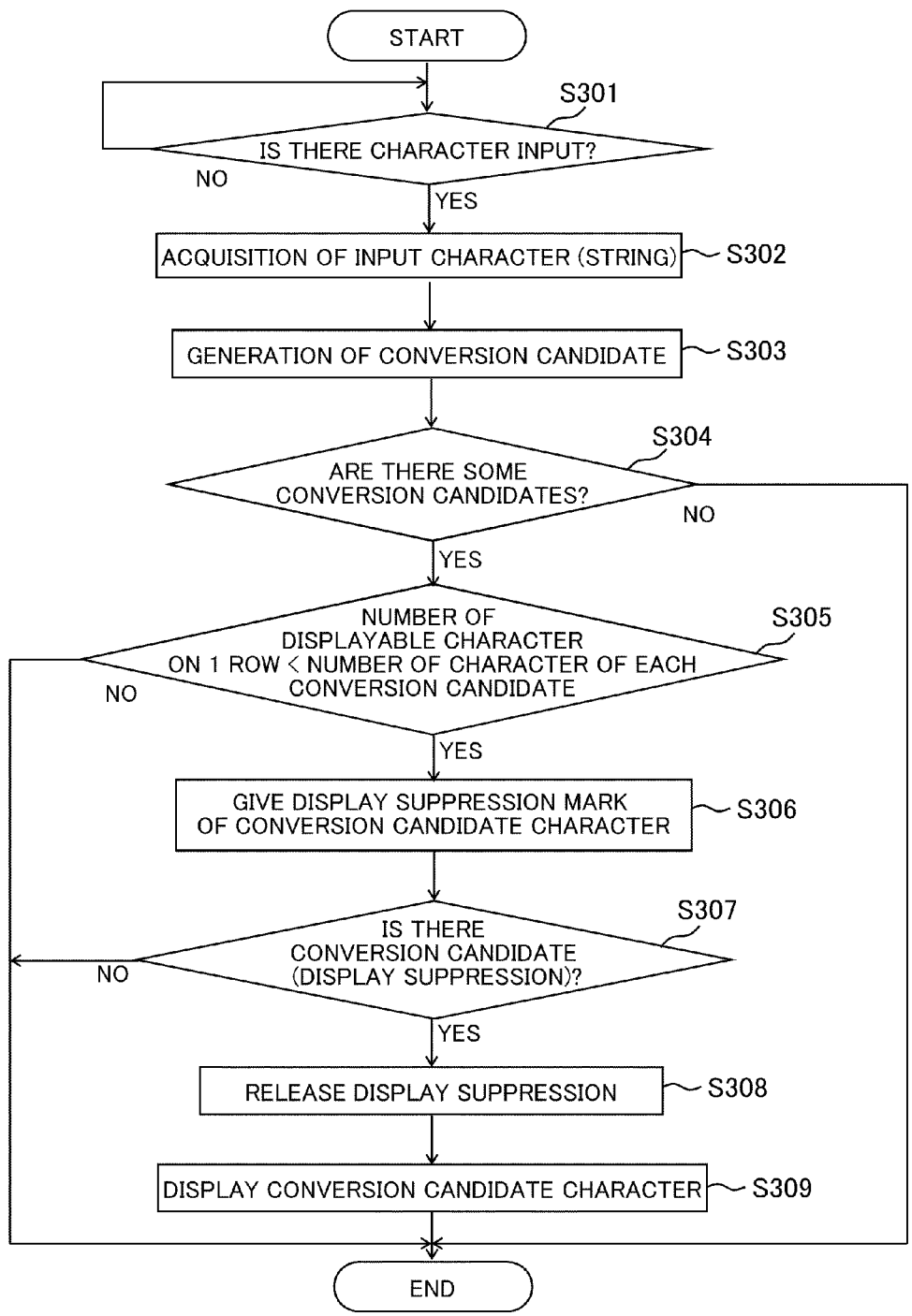
FIG. 15 is a flow chart for explaining the operation of the mobile display device according to the present third embodiment.

FIG. 15 is a flow chart for explaining the operation of the mobile display device according to the present third embodiment.

Below, a detailed explanation will be given of the operation of the mobile display device according to the present third embodiment with reference to the flow chart shown in FIG. 15.

In the flow chart of FIG. 15, at the time of preparation of outgoing mail, the user operates character keys assigned to the operation part 12 to input the character (step S301 "Yes").

Upon receipt of this, the input character acquisition part 181 of the control part 18 converts an input character or input string of character to key codes by a key scan etc. and fetches the same (step S302) and outputs those key codes to the conversion candidate generation part 182.

When there is no character input (step S301 "No"), the input character acquisition part 181 waits until character input by the user occurs.

The conversion candidate generation part 182B refers to the conversion dictionary 171 stored in the memory part 17 based on the fetched key codes, generates conversion candidates by for example phonetic kana syllabary/Sino-Japanese ideograph conversion (step S303), and supplies the result to the character number judgment part 186B.

Here, when there are a plurality of conversion candidates (step S304 "Yes"), the conversion candidate generation part 182B further refers to the display priority list 172 stored in the memory part 17 and outputs those conversion candidates to the character number judgment part 186B according to the display priority orders configured to be updatable based on the past use history.

Note that, the conversion candidate output with the highest priority here is the conversion candidate most recently selected as the candidate.

On the other hand, the character number judgment part 186B compares all conversion candidates supplied from the conversion candidate generation part 182B with the above displayed character suppression threshold value 187 and outputs the result to the displayed character suppression control part 188.

When receiving information from the character number judgment part 186B that the number of character of a conversion candidate exceeds the displayed character suppression threshold value (step S305 "Yes"), the displayed character suppression control part 188 performs suppression control of the character display so as not to display the conversion candidate character related with that exceeded part.

Further, at this time, the displayed character suppression control part 188, together with the suppression of character display of a conversion candidate, displays as a note that suppression was performed by for example a paragraph return mark or arrow mark (step S306).

Figure 16A:
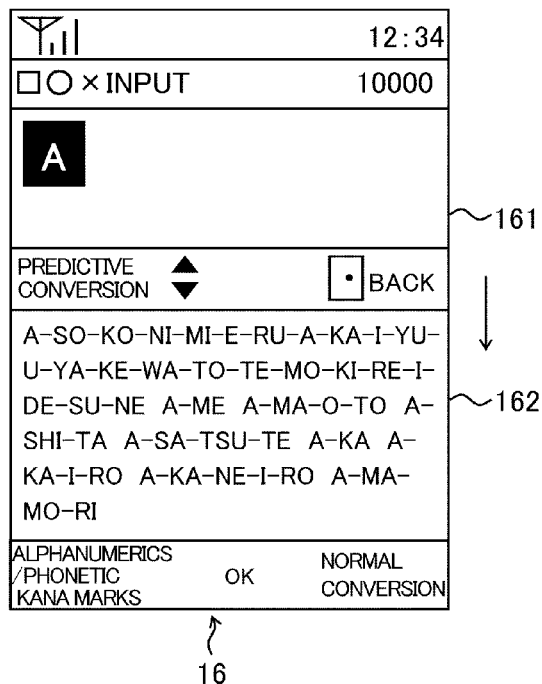
FIG. 16A and FIG. 16B are diagrams showing one example of the display screen configuration generated by character display suppression control of the conversion candidates described above.
Figure 16B:
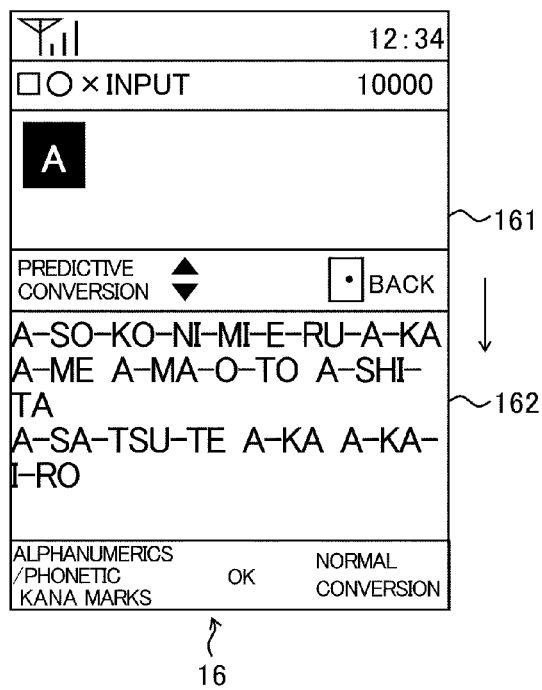

The later explained FIG. 16B is a view showing one example of the display screen configuration suppressing character display of a conversion candidate by a paragraph return mark.

Note that, in the processing of step S304, when there is just one conversion candidate from the conversion candidate generation part 182B (step S304 "No"), the displayed character suppression control part 188 does not suppress the character display of the conversion candidate described above. It displays the character without suppressing the single conversion candidate (step S309).

Figure 17:
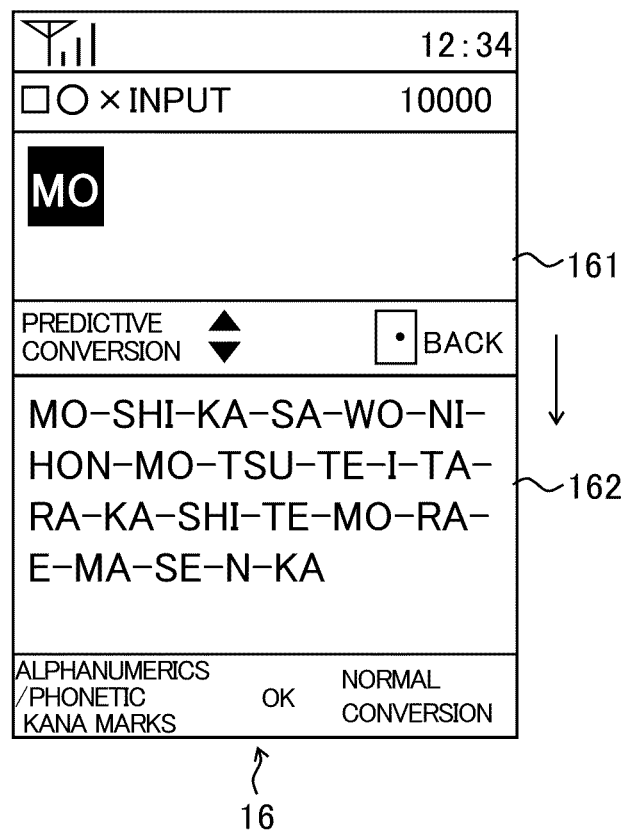
FIG. 17 is a diagram showing an example of the screen configuration of a display in a case where only one conversion candidate exists (case of single candidate).

FIG. 17 is a view showing an example of the display screen configuration in this case.

Next, in the state where display of character of a conversion candidate is suppressed as described above, the user operates the operation part 12 to select the conversion candidate to be suppressed in character display (step S307 "Yes").

The displayed character suppression control part 188 releases the character display suppression of the selected conversion candidate (step S308) and displays the conversion candidate in the conversion candidate character display region 162 of the display part 16 without character display suppression (step S309).

Note that, when no conversion candidate to be suppressed in character display is selected (step S307 "No"), display of the conversion candidate to be displayed in the conversion candidate character display region of the display part 16 is continued (step S309).

FIG. 16A and FIG. 16B are views showing one example of the display screen configuration generated by the character display suppression control of conversion candidates described above.

FIG. 16A shows an example of the display screen configuration at the time of the setting the normal mode, while FIG. 16B is an example of the configuration at the time of setting the enlarged mode.

As shown in FIG. 16B, assume the number of character of a conversion candidate is relatively large and other conversion candidates cannot be displayed fully and that, in that case, just the nine characters which can be displayed on one row of the conversion candidate character display region 162 (A-SO-KO-NT-MI-E-RU-A-KA (THE RED . . . VISIBLE THERE)) are displayed.

By replacing the number of characters which cannot be displayed any further (I-YU-AKE-WA-TO-TE-MO-KI-RE-I-DE-SU ( . . . EVENING GLOW . . . IS VERY BEAUTIFUL)), that is, part relating to the part exceeding the displayed character suppression threshold value, with a paragraph return mark etc., the next conversion candidate is displayed on the next row.

FIG. 17 is a view showing an example of such a screen configuration of display when there is only one conversion candidate (case of single candidate).

As shown in FIG. 17, when there is a single conversion candidate, the situation where other conversion candidates cannot be displayed fully will never happen, therefore all characters of one existing conversion candidate (MO-SHI-KA-SA-WO-NI-HON-MO-TSU-TE-I-TA-RA-KA-SHI-TE-MO-RA-E-MA-SE-N-KA (COULD YOU LEND ME AN UMBRELLA IF YOU HAVE TWO?)) are displayed in the conversion candidate character display region 162.

Figure 18A:
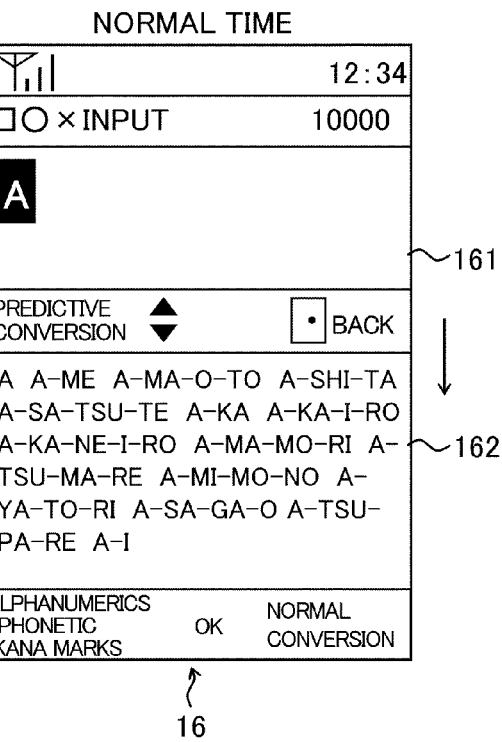
FIG. 18A and FIG. 18B are diagrams showing an example of a normal display screen configuration as a comparative example.
Figure 18B:
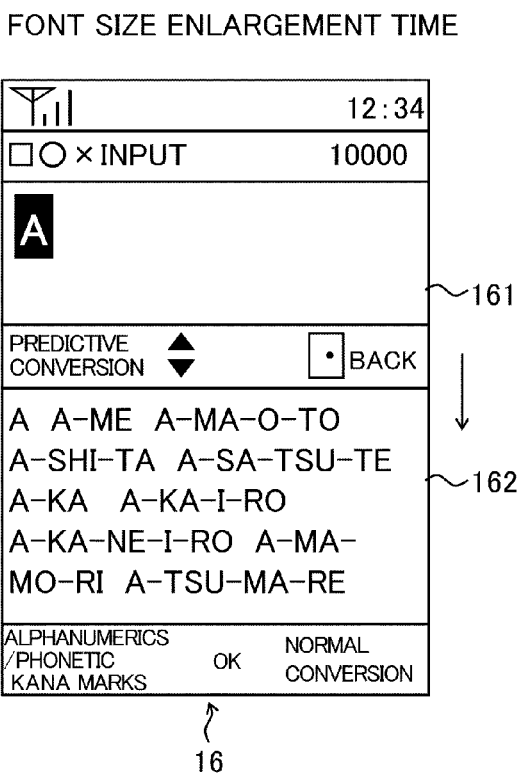
Figure 19A:
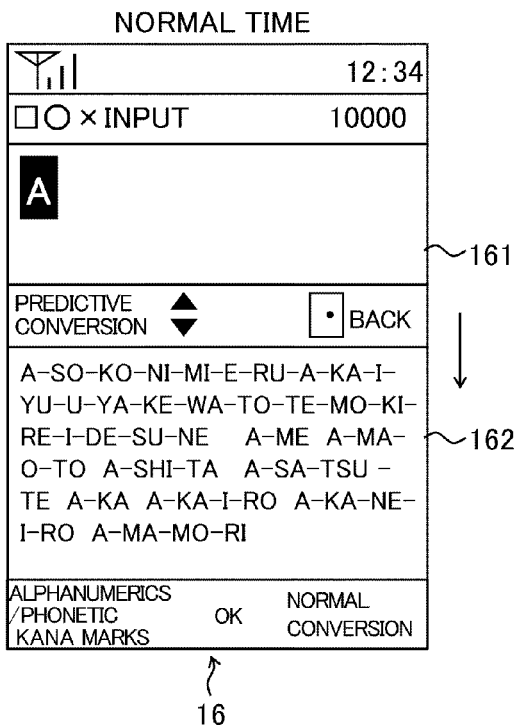
FIG. 19A and FIG. 19B are diagrams showing an example of a normal display screen configuration as a comparative example.
Figure 19B:
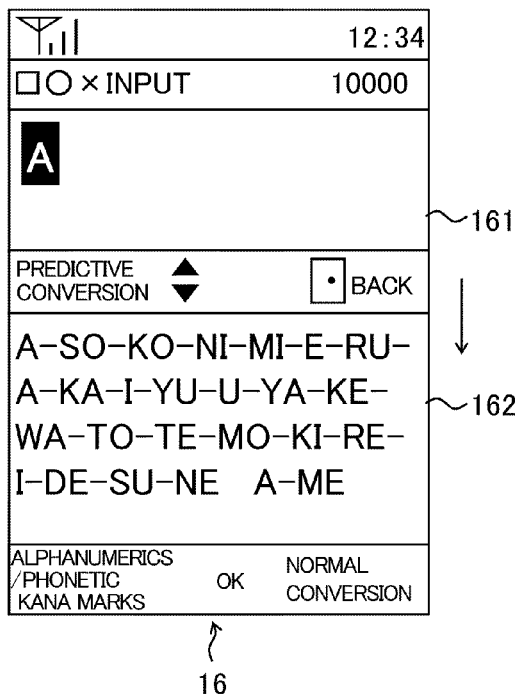

Note that, FIG. 18A and FIG. 18B and FIG. 19A and FIG. 19B show examples of the normally displayed screen configuration as comparative examples, wherein, in the same way as FIG. 16A and FIG. 16B, FIG. 18A and FIG. 19A show the example of the display screen configuration at the time of setting the normal mode, and FIG. 18B and FIG. 19B show the example of the configuration at the time of setting the enlarged mode.

In the example of FIG. 18A and FIG. 18B, the number of conversion candidates displayed in the conversion candidate character display region 162 decreases since the font is enlarged.

Further, in the example of FIG. 19A and FIG. 19B, it is seen that the most recently selected conversion candidate extends over 3 rows and that display of other conversion candidates is limited.

As explained above, according to the mobile display device according to the present third embodiment, in a case where there are a plurality of characters of a conversion candidate having a high display priority and display of the other conversion candidates is restricted, for example only 1 row of the conversion candidate exceeding the character suppression threshold value is displayed and the number of characters which cannot be displayed any more are replaced by display of an icon etc. Due to this, character of the conversion candidate is displayed enlarged, so visibility is improved. While doing this, it becomes possible to display the other conversion candidates in the next row. The number of conversion candidates which can be displayed in the conversion candidate character display region 162 therefore increases, and the usability at the time of selection of the conversion candidate can be maintained as well.

Further, in a case where there is a single conversion candidate or where the number of the other conversion candidates is small and therefore everything can be displayed, a more flexible approach is possible by enabling display of all character even in a case where the number of character configuring the single conversion candidate exceeds the displayed character suppression threshold value, so usability is improved.

Fourth Embodiment

Next, a mobile phone 1 is provided with a function restricting the menu display and function settings or changing the function setting values or the like (specific function) for easy use tailored to elderly persons or kids or a lifestyle of a user. The font size can be switched in synchronization with the setting of this function. Such a mobile phone 1 will be explained below as a fourth embodiment.

According to the fourth embodiment explained below, the configuration of the internal portion of the mobile phone 1 is similar to that in the embodiment shown in FIG. 14. However, the configuration of the internal portion and operation of a control part 18C are partially different.

Figure 20:
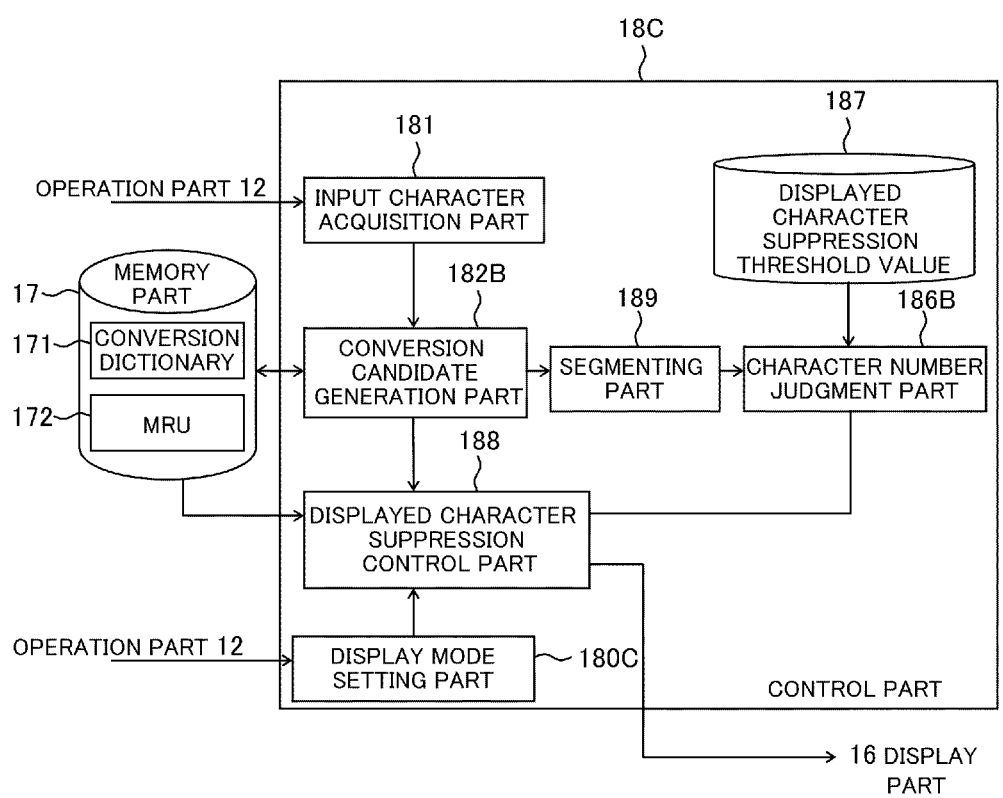
FIG. 20 is a block diagram showing an example of the configuration of a control part according to a present fourth embodiment.

FIG. 20 is a block diagram showing an example of the configuration of the control part 18C according to the present fourth embodiment.

The control part 18C of FIG. 20 is configured with a display mode setting part 180C and a segmenting part 189 further added to the configuration of the control part 18B of FIG. 14.

The display mode setting part 180C manages a first mode (normal mode) displaying the input character to be displayed in the input character display region of the display part 16 and conversion candidates for the input character displayed in the conversion candidate character display region by a first font size for enlarged display and a second display mode (enlarged mode) displaying conversion candidates of the input character by a second font size larger than the first font size and suppressing the enlarged display of the first mode.

The display mode setting part 180C controls suppression of the displayed character by the displayed character suppression control part 188 according to the user settings input through the operation part 12.

When set to the normal mode, the displayed character suppression control part 188 does not suppress the character display of a conversion candidate even if the region required for displaying the conversion candidate of the input character in the conversion candidate character display region 162 of the display part 16 would exceed a predetermined display region.

On the other hand, when set to the enlarged mode, the displayed character suppression control part 188 performs control so that if a display region required for displaying a conversion candidate generated by conversion of the input character in the conversion candidate character display region 162 of the display part 16 would exceed a predetermined display region, character display of this conversion candidate is suppressed.

Note that, the segmenting part 189 breaks down one or more conversion candidates for the input character generated at the conversion candidate generation part 182B into individual segments which it supplies to the character number judgment part 186B. This is added with the intent not of judging the number of character in units of rows as in the first embodiment, but judging the number of character in unit of segments.

Here, "suppression of the character display" means control performed so that the character part relating to a first segment of a segmented conversion candidate is displayed in the conversion candidate character display region 162 of the display part 16, but character other than character part relating to the first segment is not displayed.

Namely, when the number of character of a segment of a conversion candidate obtained by the segmenting part 189 would exceed the displayed character suppression threshold value, the suppression control of the displayed character of the conversion candidate shown in the first embodiment is carried out.

Figure 21:
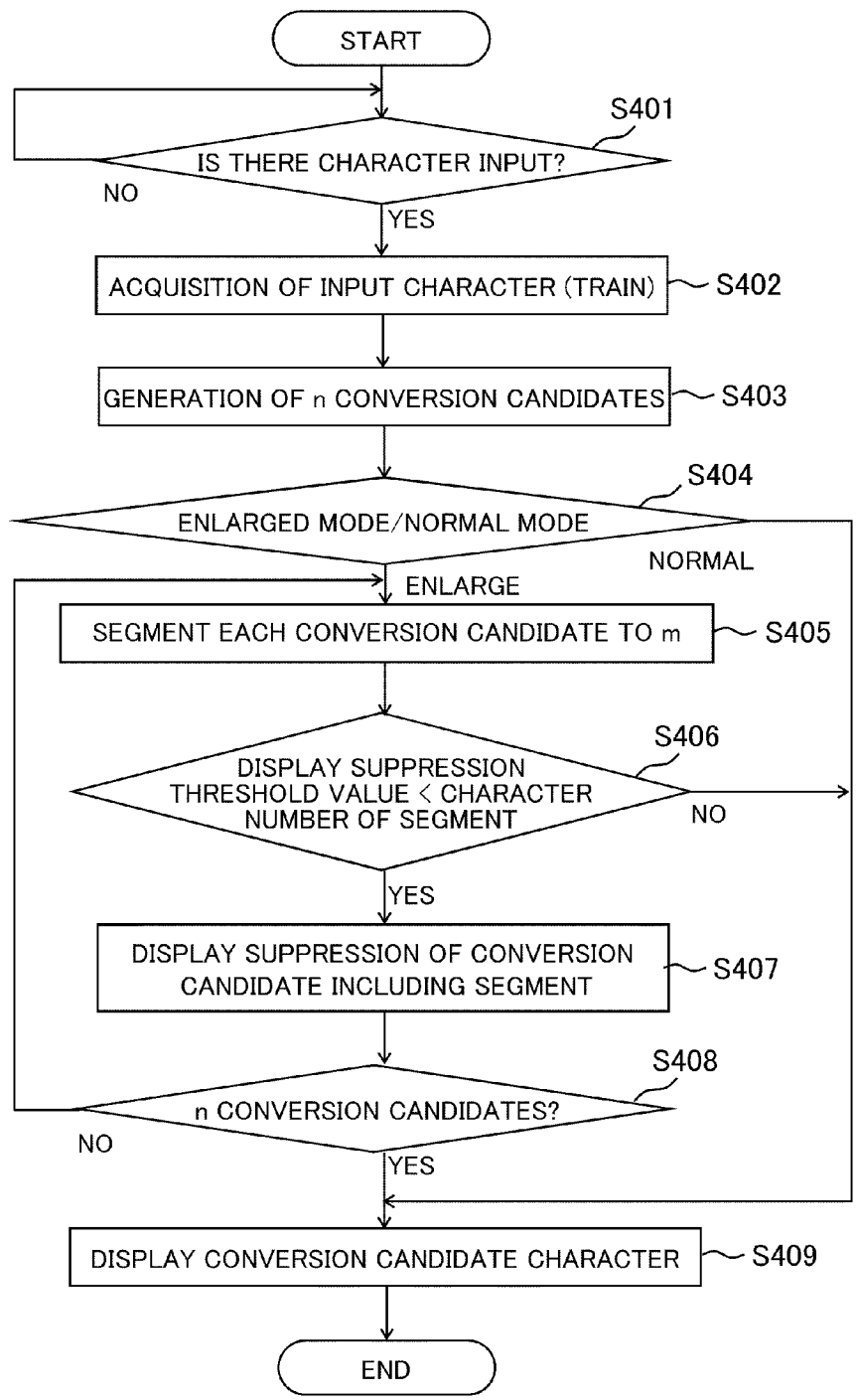
FIG. 21 is a flow chart for explaining the operation of the mobile display device according to the present fourth embodiment.

FIG. 21 is a flow chart for explaining the operation of the mobile display device according to the present fourth embodiment.

Below, a detailed explanation will be given of the operation of the mobile display device according to the present fourth embodiment with reference to the flow chart shown in FIG. 21.

At the time of preparation of outgoing mail, the user operates the character keys assigned to the operation part 12 to input the character (step S401 "Yes").

Upon receipt of this, the input character acquisition part 181 of the control part 18C converts an input character or input string of character to key codes by a key scan etc. and fetches the same (step S402) then outputs these to the conversion candidate generation part 182.

When there is no character input (step S401 "No"), the input character acquisition part 181 waits until character input occurs.

The conversion candidate generation part 182B generates conversion candidates according to for example phonetic kana syllabary/Sino-Japanese ideograph conversion based on the fetched key codes with reference to the conversion dictionary 171 stored in the memory part 17 (step S403) and outputs the result to the segmenting part 189.

Here, when there are a plurality of conversion candidates, the conversion candidate generation part 182B further refers to the MRU region 172 stored in the memory part 17 and outputs those conversion candidates to the character number judgment part 186B according to the display priority orders updated based on the past use history.

Note that, the conversion candidate output with the highest priority here is the most recently selected conversion candidate.

Here, assume that the user operates the operation part 12 so that the enlarged mode is set (step S404 "Enlarge"). The display mode setting part 180C starts up the suppression processing of the displayed character of the conversion candidate by the displayed character suppression control part 188.

Namely, the segmenting part 189 acquiring the plurality of conversion candidates from the conversion candidate generation part 182B divides all conversion candidates into segment units which it outputs to the character number judgment part 186B (step S405).

Due to this, the character number judgment part 186B compares all of the output conversion candidates with the above displayed character suppression threshold value and outputs the results to the displayed character suppression control part 188.

When receiving the result that the displayed character suppression threshold value is less than the conversion candidate character length (S406 "Yes") from the character number judgment part 186B, the displayed character suppression control part 188 performs control so as to display the character part relating to the first segment of the conversion character covered by the results in the conversion candidate character display region of the display part 16, but not to display character other than the character part relating to the first segment, that is, suppresses character display (step S407).

The above processing (steps S406 and S407) is repeatedly executed for each conversion candidate (step S408).

On the other hand, in the processing of step S404, when the normal mode is instructed as the display mode (step S404 "Normal"), the number of conversion candidates which can be displayed in the conversion candidate character display region 162 is larger than that at the time of the enlarged mode.

For this reason, the necessity of performing control for suppression of character display of a conversion candidate described above is small, therefore the displayed character suppression control part 188 displays all character configuring the conversion candidate (step S409).

Note that, in the state where display of character of a conversion candidate is suppressed as described above, when a conversion candidate (segment) for which the character display is suppressed is selected by the user, the conversion candidate of the next and following segments after the suppressed display segment are displayed.

As explained above, according to the mobile display device according to the present fourth embodiment, for example, by setting the enlarged mode at the time of a specific function aimed at elderly persons, it becomes possible to display a large number of conversion candidates in the conversion candidate character display region 162 of the display part 16 even in a case where the number of character of the conversion candidate is relatively large (long), so the usability the same as that at the time of the normal mode can be kept.

Further, by the mode selection, the display method of conversion candidates can be automatically changed, so the convenience of the user is improved.

Note that, when a conversion candidate is long, not all of the character of this conversion candidate is suppressed. Display of the character part of the conversion candidate relating to segments after the first segment is suppressed. Due to this, the user can at least recognize the first segment of the conversion candidate suppressed in display. Therefore it becomes easy to understand the meaning and content of the conversion candidate suppressed in display, so ease of selection of the conversion candidate is improved.

Further, the control method in the mobile display device in the present third embodiment has, for example, in FIG. 14, a first step (S301, S302) of fetching the input character by the operation part 12 and a second step (S303) of converting the input character and generating one or more conversion candidates.

Further, the control method in the present third embodiment has a third step (S305) of judging whether the region required for displaying generated conversion candidates in the second display region of the display part 16 exceeds a predetermined region and a fourth step (S306) of suppressing the character display of the conversion candidate concerned when it is judged in the third step that the candidate would exceed the predetermined region.

According to the control method in the mobile display device described above, when the region for displaying a conversion candidate in the conversion candidate display region of the display part 16 would exceed a predetermined display region, display of the conversion candidate is suppressed.

For this reason, even in a case where a large display region would be needed for displaying a conversion candidate, the influence exerted upon the display of the other conversion candidates can be kept to the lowest limit, therefore a decrease in visibility of the other conversion candidates is suppressed, and usability at the time of selection of the conversion candidate can be kept.

Fifth Embodiment

Next, a fifth embodiment of the mobile display device will be explained.

Figure 22:
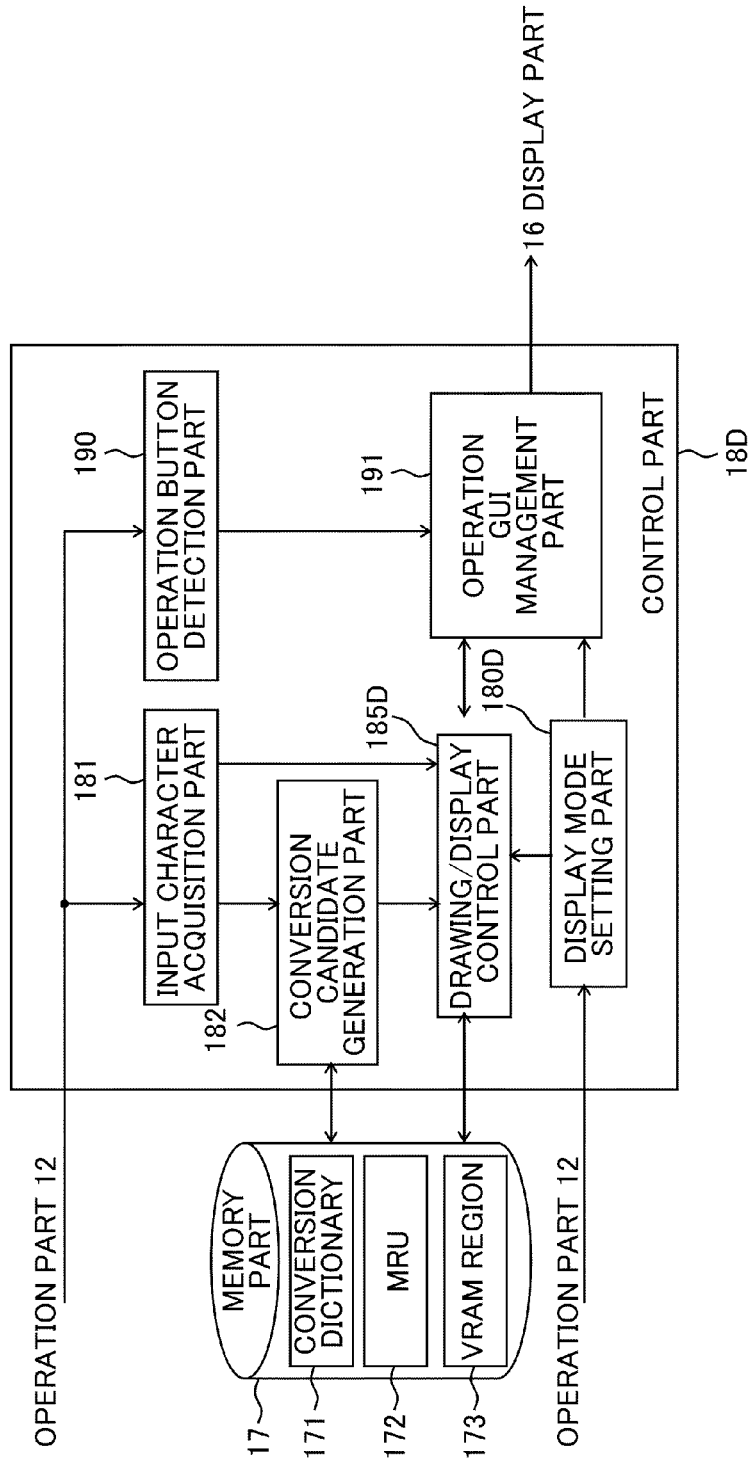
FIG. 22 is a block diagram showing an example of the configuration of a control part according to a fifth embodiment.

FIG. 22 is a block diagram showing an example of the configuration of a control part 18D according to the fifth embodiment.

In FIG. 22, for facilitating understanding, similar components as those of the control parts 18 and 18A to 18C in FIG. 3, FIG. 7, FIG. 14, and FIG. 20 are represented by the same notations.

As shown in FIG. 22, this device has a control part 18D, display mode setting part 180D, input character acquisition part 181, conversion candidate generation part 182, drawing/display control part 185D, operation button detection part 190, and operation GUI (Graphical User Interface) management part 191.

The control part 18D can set, based on a setting operation by the operation part 12, a first mode (normal mode) displaying a plurality of conversion candidates in the input character display region of the display part 16 by a first font size and a second mode (enlarged mode) displaying a plurality of conversion candidates by a size larger than the first font size.

The control part 18D performs controls by making the selection method of one conversion candidate selected from among a plurality of conversion candidates in response to the operation of the operation part 12 different between the case where the normal mode is set and the case where the enlarged mode is set.

The display mode setting part 180D performs the previously explained setting management of either of the normal mode or enlarged mode based on a setting operation by the operation part 12 and controls the operation GUI management part 191 and drawing/display control part 185D.

The input character acquisition part 181 fetches input character input by the user performing a character input operation for the operation part 12 and supplies this to the conversion candidate generation part 182.

The conversion candidate generation part 182 acquires a plurality of conversion candidates with reference to the conversion dictionary 171 stored in the memory part 17 based on input character fetched by the input character acquisition part 181.

The conversion candidate generation part 182 refers to the MRU region 172 for each acquired conversion candidate and displays a plurality of conversion candidates according to the priority orders defined in the conversion candidate character display region 162 of the display part 16 through the drawing/display control part 185D.

The drawing/display control part 185D divides the display part 16 to two screens so that it is possible to individually display the input character fetched by the input character acquisition part 181 and a plurality of conversion candidates generated by the conversion candidate generation part 182 in the input character display region 161 and the conversion candidate character display region 162 and draws (writes) these in the VRAM region 173 of the memory part 17.

Further, the drawing/display control part 185D reads out and displays these in the display part 16 in synchronization with the display timing of the display device configuring the display part 16.

The operation button detection part 190 detects a signal generated corresponding to the operation content when a direction key (up/down/right/left: ↑, ↓, →, ←), an execute key, a send key, or other operation button assigned to the operation part 12 is operated by the user.

Further, the operation button detection part 190 controls drawing and display of the conversion candidate displayed in the conversion candidate character display region 162 of the display part 16 by the drawing/display control part 185D through the operation GUI management part 191.

The operation GUI management part 191 executes the conversion candidate selection processing of performing control while making the selection method of one conversion candidate in response to the sequential selection operation of the operation part 12 different between the case where the normal mode is set and the case where the enlarged mode is set.

Specifically, when the normal mode is set by the display mode setting part 180D, the operation GUI management part 191 operates so as to select one conversion candidate from among the plurality of conversion candidates displayed in the conversion candidate character display region 162 of the display part 16 in response to the selection operation (first operation) of the operation part 12.

Further, when the enlarged mode is set, the operation GUI management part 191 operates so as to display conversion candidates (conversion candidates of the next page) different from the plurality of conversion candidates displayed in the conversion candidate character display region 162 of the display part 16 in response to the previous selection operation of the operation part 12 in the same display region and select one conversion candidate selected from among the plurality of conversion candidates concerned with this display.

The operation GUI management part 191 further performs the following processing when the normal mode is set by the display mode setting part 180D.

When the next operation is carried out in a state where all of the plurality of conversion candidates displayed in the conversion candidate character display region 162 of the display part 16 are sequentially selected in response to the selection operation of the operation part 12, the operation GUI management part 191 displays conversion candidates (conversion candidates of the next page) different from the displayed plurality of conversion candidates and selects one conversion candidate from among the plurality of conversion candidates concerned with this display.

Further, when the enlarged mode is set, if a second selection operation different from the first selection operation by the operation part 12 is carried out, the operation GUI management part 191 selects one conversion candidate from among the plurality of conversion candidates displayed in the conversion candidate character display region 162 of the display part 16 at the time of this second selection operation.

Note that, when the enlarged mode is set by the display mode setting part 180D, the drawing/display control part 185D updates the VRAM 173 region of the memory part 17 so that scrolling is possible at a faster or slower speed compared with the case where the normal mode is set.

At this time, the operation GUI management part 191 operates so as to perform sequential selection operation of one conversion candidate from among the plurality of conversion candidates which are scrolled in the conversion candidate character display region 162 of the display part 16.

The functions provided in the blocks 180D, 181, 182, 185D, 190, and 191 described above are achieved by running programs stored in the memory part 17 at the control part 18D.

These blocks do not only indicate blocks substantially differentiated from the other blocks and built-in the control part 18D. The processing parts are separately expressed just for simplification of the explanation.

Figure 23:
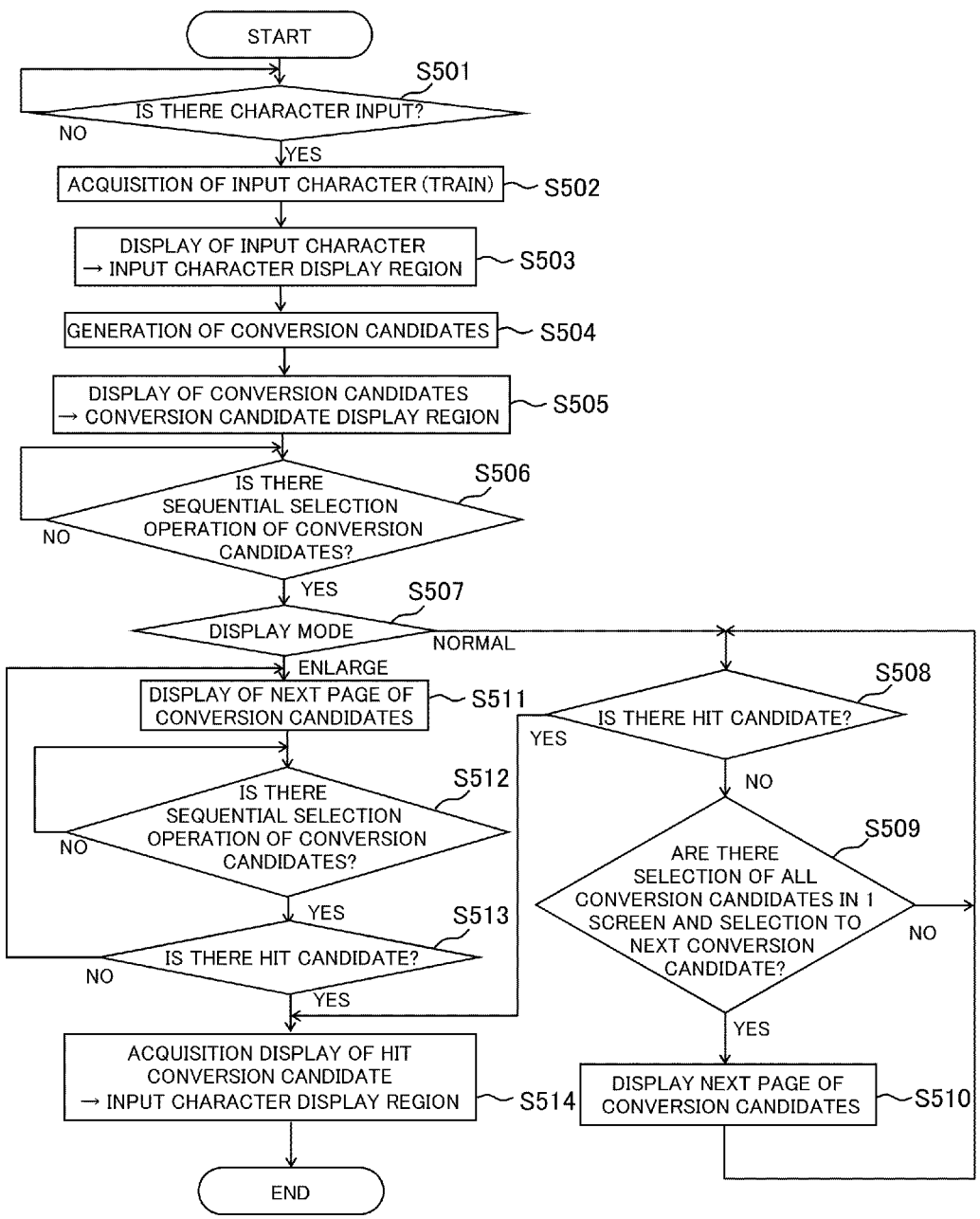
FIG. 23 is a flow chart for explaining the operation of the mobile display device according to the present fifth embodiment.

FIG. 23 is a flow chart for explaining the operation of the mobile display device according to the present fifth embodiment.

FIG. 24A to FIG. 24F are screen transition diagrams of the mobile display device according to the present fifth embodiment.

Below, a detailed explanation will be given of the operation of the mobile display device according to the present fifth embodiment with reference to the flow chart of FIG. 23 and screen transition diagrams of FIG. 24A to FIG. 24F.

At the time of preparation of outgoing mail by the mobile phone 1, the user performs a character input operation of operating the character keys assigned to the operation part 12 so as to input character (step S501 "Yes").

Upon receipt of this, the input character acquisition part 181 of the control part 18D converts the input character or input string of character to key codes by a key scan etc. and fetches the same (step S502), supplies these to the drawing/display control part 185D, displays these in the input character display region 161 of the display part 16, and supplies these to the conversion candidate generation part 182 (step S503).

On the other hand, when there is no character input (step S501 "No"), the input character acquisition part 181 of the control part 18D waits until character is input.

The conversion candidate generation part 182 refers to the conversion dictionary 171 stored in the memory part 17 based on the fetched key codes, generates conversion candidates to for example phonetic kana syllabary/Sino-Japanese ideograph conversion, supplies the result to the drawing/display control part 185 (step S504), and displays these in the conversion candidate character display region 162 of the display part 16 (step S505).

Here, when there are a plurality of conversion candidates, the conversion candidate generation part 182 further refers to the MRU region 172 stored in the memory part 17 and outputs those conversion candidates according to the display priority orders automatically updated based on the past use history.

Note that, the conversion candidate output with the highest priority here is the conversion candidate most recently selected by the user.

Next, when the user performs a selection operation (first operation) of a conversion candidate by using the direction keys (↑, ↓, →, ←) assigned to the operation part 12 (step S506 "Yes"), if the normal mode is set as the display mode by the display mode setting part 180 (step S507 "Normal"), the selection processing of conversion candidate character by the operation GUI management part 191 is started up.

For example, on the mail preparation screen, as shown in FIG. 24A, when an operation for input of the phonetic character "a" is performed, the conversion candidate list for this is displayed, then, as shown in FIG. 24B, the direction key (↓) for performing sequential selection of conversion candidates from the inside of the conversion candidate list is depressed, the operation button detection part 190 detecting the depression of this direction key (↓) controls the operation GUI management part 191.

The operation GUI management part 191 judges presence/absence of a hit character candidate upon receipt of the sequential selection of the direction key (↓) and the fact that the execute key is operated (step S508). Here, when the execute key is depressed (step S508 "Yes"), the operation GUI management part 191 judges that there is a hit conversion candidate, acquires the hit conversion candidate, and controls the drawing/display control part 185D to make it display that conversion candidate in the input character display region 161 of the display part 16 (step S514).

Further, when there is no selected conversion candidate (step S508 "No"), if it is further detected that further operation is performed in a state where all of the plurality of conversion candidates displayed in the conversion candidate character display region 162 are sequentially selected (step S509 "Yes"), the operation GUI management part 191 performs the next processing.

The operation GUI management part 191, as shown in FIG. 24C, controls the drawing/display control part 185D, instructs display of a plurality of conversion candidates of the next page which are different from the already displayed conversion candidates, and prompts selection of one conversion candidate from among the plurality of conversion candidates concerned with this display (step S510).

Note that, here, in place of displaying a plurality of conversion candidates of the next page different from the already displayed conversion candidates, it is also possible to display a plurality of conversion candidates of the next row which are different from part of the already displayed conversion candidates.

On the other hand, the enlarged mode is set as the display mode by the display mode setting part 180D (step S507 "Enlarge").

In this case, as shown in FIG. 24D and FIG. 24F, when the direction key (↓) is depressed, the operation GUI management part 191 controls the drawing/display control part 185D and instructs it to display the conversion candidates which should be displayed in the next page among a plurality of conversion candidates generated by the conversion candidate generation part 182 (step S511).

Further, a selection operation (second operation) by sequential depression of another direction key which differs from the previous direction key (↓), for example, the direction key (→) as shown in FIG. 24E, is detected by the operation button detection part 190 (step S512 "Yes").

When there further occurs depression of the execute key at a cursor position of a suitable conversion candidate (step S513 "Yes"), the operation GUI management part 191 acquires that conversion candidate and controls the drawing/display control part 185D to make it display that conversion candidate in the input character display region 161 of the display part 16 (step S514).

Further, in a case where it is detected that a further selection operation is carried out in a state where all of the plurality of conversion candidates displayed in the conversion candidate character display region 162 are sequentially selected, that is, a case where no hit conversion candidate exists in that page (step S513 "No"), the routine returns to the processing of step S511.

Further, the operation GUI management part 191 controls the drawing/display control part 185D, instructs display of the plurality of conversion candidates existing in the next page, and prompts selection of one conversion candidate from among the plurality of conversion candidates concerned with this display.

As explained above, according to the mobile display device according to the embodiment of the present invention, by control by the control part 18D (operation GUI management part 191) so as to make the selection method of the selection candidate differ between the case of setting the normal mode and the case of setting the enlarged mode, the usability at the time of selection of the conversion candidate is improved. That is, compared with the normal mode, in the enlarged mode in which the number of the conversion candidates which are displayed in the conversion candidate character display region 162 is small, conversion candidates to be displayed in the next page are displayed in response to depression of the direction key (↓), therefore the user can easily search for the conversion candidate desired by himself even in the enlarged mode, so the usability is improved.

Note that, although illustration is omitted in the flow chart shown in FIG. 23 and screen transition diagrams in FIG. 24A to FIG. 24F, the operation GUI management part 191 cooperates with the drawing/display control part 185D. Due to this, when the enlarged mode is set by the display mode setting part 180D, the operation GUI management part 191 may also perform control so as to perform a sequential selection operation of one conversion candidate from among the plurality of conversion candidates displayed in the conversion candidate character display region 162 of the display part 16 at a speed faster than that in the usual case where the enlarged mode is set.

Due to this, even when the display size is enlarged and the number of conversion candidates displayed within a page decreases, appearance of a required conversion candidate becomes faster due to high speed scrolling, so it is possible to maintain the usability.

Conversely, when the enlarged mode is set by the display mode setting part 180D, control may be carried out as well so as to perform sequential selection operation of one conversion candidate from among the plurality of conversion candidates displayed in the conversion candidate character display region 162 of the display part 16 at a speed slower compared with that in the usual case where this enlarged mode is set.

Due to this, unrushed candidate selection by low speed scrolling becomes possible, therefore a mobile display device easy particularly for a beginner, elderly person, or the like unfamiliar with its operation can be provided.

Further, according to the present fifth embodiment described above, an explanation was given only of a mode of executing the selection processing of a conversion candidate at the time of enlargement of the display size described above only in a case where depression of the down key (↓) and right key (→) is detected among direction keys (↑, ↓, →, ←). However, the same control is possible even when left/right keys are combined other than this.

For example, as shown in FIG. 25A to FIG. 25E as other screen transition diagrams, rightward movement of the cursor for conversion candidates is possible by the depression of the right key (→), and leftward movement of the cursor for conversion candidates is possible by the depression of the left key (←) (FIGS. 25C and 25D).

Further, as shown in FIG. 25C and FIG. 25E, display of conversion candidates of the previous page becomes possible by depression of the up key (↑), and display of a plurality of conversion candidates of the next page becomes possible by depression of the down key (↓).

According to the screen transitions shown in FIG. 25A to FIG. 25E, by performing the movement control of the selection candidate by the left/right keys at the time of enlargement of the display size and performing the page up/down control of the previous page and the next page by the up/down keys, an intuitive selection operation of conversion candidates becomes possible. This can contribute to the improvement of operability at the time of conversion candidate selection.

Further, unlike the conventional case, operation by a soft key becomes unnecessary for page advance. A page selection operation by sequential depression of the down key becomes unnecessary also. Therefore, the number of times of operation decreases and the time for reaching the target conversion candidate is shortened as well.

Note that, the control method in the mobile display device according to the present fifth embodiment has, for example, in the flow chart of FIG. 23, a step of fetching the input character by the operation part 12 (S501, S502) and a step of converting the input character and generating a plurality of conversion candidates (S504).

Further, the control method according to the present fifth embodiment has steps of selecting one conversion candidate from among the plurality of conversion candidates displayed in the second display region of the display part 16 in response to the operation of the operation part 12 where the first mode is set (S507 "Normal" to S510).

Further, the control method according to the present fifth embodiment has steps of displaying conversion candidates in the second display region of the display part 16 which are different from the plurality of conversion candidates displayed in the second display region of the display part 16 in response to the operation of the operation part 12 where the second mode is set and selecting one conversion candidate from among the plurality of conversion candidates concerned with this display (S507 "Enlarge", S511 to S514).

According to the control method in the mobile display device according to the present fifth embodiment described above, by performing control so as to make the selection method of the selection candidate differ between the case where the display size of the conversion candidate of the character is enlarged and the case where it is not enlarged, the usability can be kept and improved without exerting an influence upon display of the other conversion candidates even in a case where the font size is enlarged for improving the visibility.

Note that, according to the mobile display device according to the first to fifth embodiments described above, only a mobile phone 1 was exemplified as the mobile display device, but the invention can be similarly applied even in a case of mounting the functions in a device having a similar configuration, for example, a PDA (Personal Digital Assistant), electronic address book, game machine, or notebook personal computer.

Further, the functions provided in the control part 18D shown in FIG. 22 may all be realized by software or at least partially realized by hardware.

For example, the data processing in the input character acquisition part 181, conversion candidate generation part 182, operation button detection part 190, display mode setting part 180D, drawing/display control part 185D, and operation GUI management part 191 may be realized on a computer by one or more programs or at least a portion thereof may be realized by hardware.

Further, where the mobile phone 1 is provided with a specific function of limiting the menu display and function settings or changing the function setting values for improving usability for elderly persons and kids, the control part 18D may perform control so that the enlarged mode is automatically shifted to along with startup of the specific function as well.

Further, in the embodiments explained above, the input information acquisition part acquiring input information for performing input processing of character is configured by the operation part 12 as one example. However, it may be configured by a microphone or other audio input device as well. In this case, by recognition of audio input to a microphone by an audio recognition function, the input information is acquired. The input processing of character is carried out in accordance with this input information. Further, another configuration in which the character input processing is carried out based on input information in accordance with input other than key depression or key touching and audio input may be employed as well.

The invention claimed is:

1. A mobile display device, comprising:
   an input information acquisition part acquiring input information,
   a display part having a first display region and a second display region, and
   a control part which performs processing for input of a character in accordance with the input information acquired by the input information acquisition part, displays the input character in the first display region of the display part, and displays a plurality of conversion candidates of the input character in the second display region of the display part, wherein
   the control part determines at least one conversion candidate to be displayed in the second display region among the plurality of conversion candidates in accordance with a display size of the conversion candidates displayed in the second display region, wherein the control part changes display priorities of the plurality of conversion candidates in the second display region in accordance with a display size of the conversion candidates displayed in the second display region and the control part sets degrees of priority of display of the conversion candidates depending upon the number of displayable characters in the second display region based on the display size of the conversion candidates and a number of characters of each of the plurality of conversion candidates, wherein setting the degrees of priority comprises an operation to rearrange the conversion candidates in a list comprising the conversion candidates where the rearranging is done at least according to their respective lengths.

2. A mobile display device as set forth in claim 1, wherein the control part sets a conversion candidate to be displayed second based on a difference between the number of displayable characters in the second display region and the number of characters of the conversion candidate displayed first.

3. A mobile display device as set forth in claim 1, wherein the control part makes the conversion candidate to be displayed first in the second display region the same conversion candidate irrespective of the display size of the character of the conversion candidates.

4. A mobile display device as set forth in claim 1, wherein the control part has a plurality of conversion candidate lists of the pluralities of conversion candidates in accordance with display sizes of the conversion candidates.

5. A mobile display device as set forth in claim 1, wherein the control part changes a display area of the second display region in accordance with the display size of the conversion candidates.

6. A mobile display device as set forth in claim 1, wherein the control part displays a conversion candidate selected from the plurality of conversion candidates displayed in the second display region in the display part in an enlarged size when the display size of the conversion candidate displayed in the second display region is smaller than the display size of the input character displayed in the first display region.

7. A mobile display device as set forth in claim 6, wherein the control part displays the conversion candidate selected from the plurality of conversion candidates in the display part while enlarging its size to the display size of the input character displayed in the first display region.

8. A mobile display device as set forth in claim 6, wherein the control part scrolls the conversion candidates when displaying the conversion candidate selected from the plurality of conversion candidates in an enlarged size.

9. A mobile display device as set forth in claim 1, wherein the control part suppresses display of a conversion candidate when the display region required for displaying the conversion candidate in the display part in accordance with the display size of the conversion candidate would exceed a predetermined display region.

10. A mobile display device as set forth in claim 1, wherein
    the device has with a display mode setting part enabling setting of either of a first display mode in which the plurality of conversion candidates are displayed in a first display size or a second display mode in which the plurality of conversion candidates are displayed in a second display size larger than the first display size, and
    the control part changes a display form of the conversion candidate selected from the plurality of conversion candidates being displayed in the second display region in accordance with selection information acquired at the input information acquisition part by selection of the conversion candidate to be selected from the plurality of conversion candidates by a different method in accordance with the display mode selected at the display mode setting part.

11. A mobile display device as set forth in claim 10, wherein when the first display mode is set, the control part selects one conversion candidate from the plurality of conversion candidates displayed in the display part in accordance with the selection information, while when the second display mode is set, the control part displays in the display part a plurality of conversion candidates which are different from the plurality of conversion candidates displayed in the display part in accordance with the selection information and selects one conversion candidate from the displayed plurality of conversion candidates.

12. A mobile display device as set forth in claim 10, wherein the control part changes a switching speed of the conversion candidate to be selected from the plurality of conversion candidates displayed in the display part in accordance with the selection information in accordance with the display mode set at the display mode setting part.

13. A control method in a mobile display device comprising:
- acquiring input information,
- performing processing for input of character in accordance with the acquired input information,
- displaying the input character of the input processing in a first display region of a display part,
- displaying a plurality of conversion candidates of the input character of the input processing in a second display region of the display part,
- determining at least one conversion candidate to be displayed in the second display region among the plurality of conversion candidates in accordance with a display size of the conversion candidates displayed in the second display region,
- changing display priorities of the plurality of conversion candidates in the second display region in accordance with a display size of the conversion candidates displayed in the second display region, and
- setting degrees of priority of display of the conversion candidates depending upon the number of displayable characters in the second display region based on the display size of the conversion candidates and a number of characters of each of the plurality of conversion candidates, wherein setting the degrees of priority comprises an operation to rearrange the conversion candidates in a list comprising the conversion candidates where the rearranging is done at least according to their respective lengths.

* * * * *